(12) United States Patent
Cheung et al.

(10) Patent No.: US 12,124,524 B1
(45) Date of Patent: Oct. 22, 2024

(54) GENERATING PROMPTS FOR USER LINK NOTES

(71) Applicant: Google LLC, Mountain View, CA (US)

(72) Inventors: Kinton Cheung, Toronto (CA); Rosemond Gerold Dorleans, San Francisco, CA (US); Vishu Goyal, Mountain View, CA (US); Bradley Charles Kellett, Los Altos, CA (US); Rohan Sarith Rogers, Sunnyvale, CA (US); Negin Nejati, Mountain View, CA (US); Gulhan Serhat, San Jose, CA (US); Pu Han, Mountain View, CA (US); Michiel Filip Kosters, Irvine, CA (US); Shekhar Agrawal Sharad, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/392,648

(22) Filed: Dec. 21, 2023

Related U.S. Application Data

(60) Provisional application No. 63/596,484, filed on Nov. 6, 2023.

(51) Int. Cl.
G06F 16/9538 (2019.01)
G06F 16/9535 (2019.01)

(52) U.S. Cl.
CPC ...... *G06F 16/9538* (2019.01); *G06F 16/9535* (2019.01)

(58) Field of Classification Search
CPC .......................... G06F 16/9535; G06F 16/9538
See application file for complete search history.

(56) References Cited

U.S. PATENT DOCUMENTS

| 8,214,380 | B1 * | 7/2012 | Bettinger | G06F 16/9535 707/758 |
| 11,010,436 | B1 * | 5/2021 | Peng | G06F 16/3329 |
| 2014/0089239 | A1 * | 3/2014 | Hu | G06F 16/435 706/12 |
| 2022/0321967 | A1 * | 10/2022 | Olabode | G06N 5/04 |
| 2023/0185865 | A1 * | 6/2023 | Shu | G06Q 50/01 707/732 |

* cited by examiner

Primary Examiner — Grace Park
(74) Attorney, Agent, or Firm — DORITY & MANNING P.A.

(57) ABSTRACT

Systems and methods for generating prompts for user data entry can include obtaining context data. The context data can be processed to determine whether an input entry interface is to be provided. In response to determining an input entry interface is to be provided, the context data or other data associated with a content display instance can be processed with a generative model to generate a prompt that can be provided to the user. User input data can then be obtained and stored to be provided to other users.

20 Claims, 26 Drawing Sheets

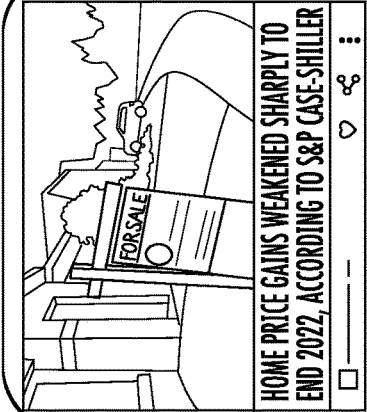

HERE ARE 3 DIFFERENT 10-WORD CONVERSATIONAL HOT TAKES TO THE ARTICLE:

1. HOME PRICES FELL SHARPLY IN DECEMBER.
2. THE HOUSING MARKET IS COOLING OFF.
3. THIS COULD BE A SIGN OF A RECESSION.

414

HERE ARE 10 10-WORD CONVERSATIONAL REACTIONS TO THE ARTICLE:

1. WOW, HOME PRICES ARE STILL RISING, BUT THE RATE OF INCREASE IS SLOWING DOWN.
2. THE HOUSING MARKET IS COOLING OFF, BUT IT'S STILL A SELLER'S MARKET.
3. MORTGAGE RATES ARE RISING, WHICH COULD PUT A DAMPER ON HOME SALES.
4. I'M NOT SURPRISED THAT HOME PRICES ARE STILL RISING, BUT I AM SURPRISED THAT THE RATE OF INCREASE IS SLOWING DOWN.
5. I THINK THE HOUSING MARKET IS COOLING OFF BECAUSE OF THE RISING MORTGAGE RATES.
6. I'M NOT SURE IF THE RISING MORTGAGE RATES WILL PUT A DAMPER ON HOME SALES, BUT ITS DEFINITELY A POSSIBILITY.
7. I THINK THE UNCERTAINTY IN THE MARKET IS CAUSING HOME BUYERS TO WATCH MORTGAGE RATES CLOSELY.
8. I THINK SELLERS WILL NEED TO PRICE THEIR HOMES APPROPRIATELY TO ATTRACT BUYERS IN THIS MARKET.
9. I THINK WE WILL SEE A CONTINUED DECLINE IN HOME PRICE GROWTH THROUGH THE FIRST QUARTER OF THE YEAR.
10. I'M NOT SURE WHAT TO EXPECT FROM THE HOUSING MARKET IN THE NEXT FEW MONTHS.

514

ARTICLE: "'HE'S GOT TO BE ON HIS A-GAME'-SMITH URGES DOE TO KEEP PUSHING TO MATCH 'HIGHEST BENCHMARK' JONES". GIVE 5 SHORT QUESTIONS FOR THIS ARTICLE. EACH QUESTION CAN BE AT MOST 50 CHARACTERS.

VIEW OTHER DRAFTS >

✦ HERE ARE 5 SHORT QUESTIONS FOR THE ARTICLE:

1. CAN DOE MATCH JONES?
2. HOW CAN DOE IMPROVE?
3. WHAT DOES RACING GROUP X EXPECT?
4. WHAT IS JONES'S BENCHMARK?
5. HOW CAN DOE HANDLE THE PRESSURE?

👍 👎 ↻ ⌨ REWRITE

516

SURE, HERE ARE 5 SHORT (AT MOST 100 CHARACTERS) DISCUSSION STARTING POINTS SPECIFIC TO THIS ARTICLE:

✦ SURE, HERE ARE 5 SHORT (AT MOST 100 CHARACTERS) DISCUSSION STARTING POINTS SPECIFIC TO THIS ARTICLE:

1. DOE NEEDS TO BRING HIS A-GAME TO MATCH JONES.
2. RACING GROUP X IS CONFIDENT DOE CAN DO IT.
3. DOE IS MOTIVATED TO PROVE HIMSELF.
4. JONES SETS THE BAR HIGH.
5. DOE IS READY TO RISE TO THE CHALLENGE.

FIG. 5C

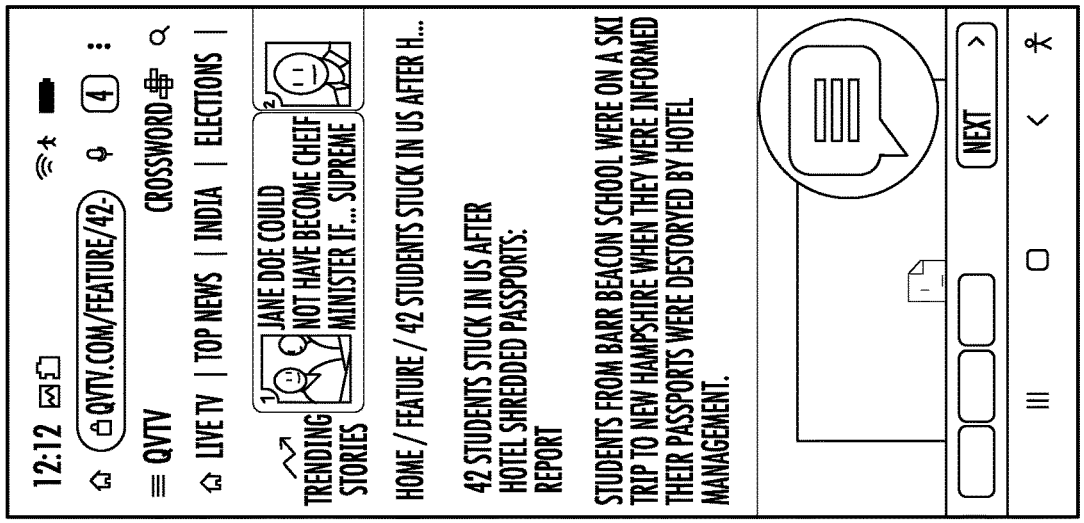
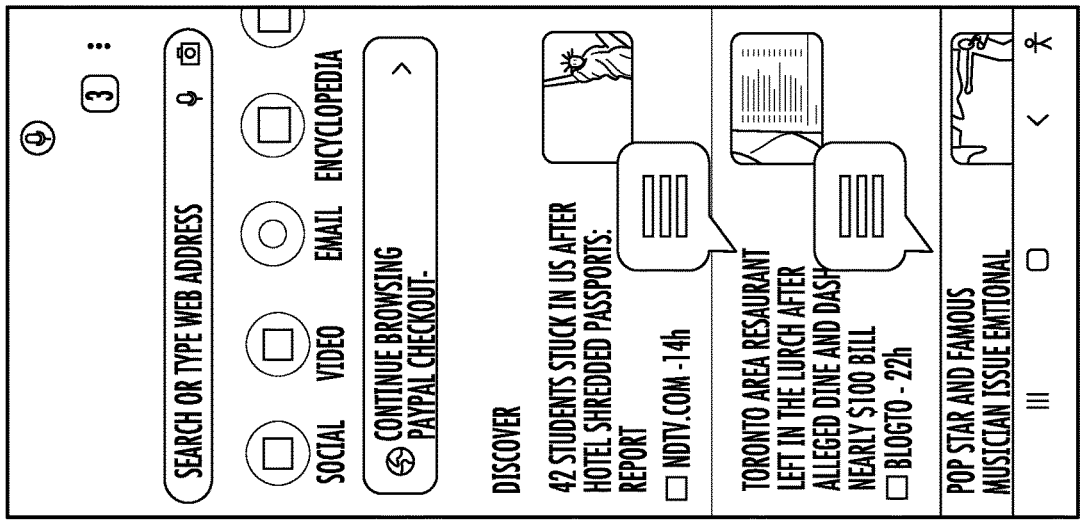
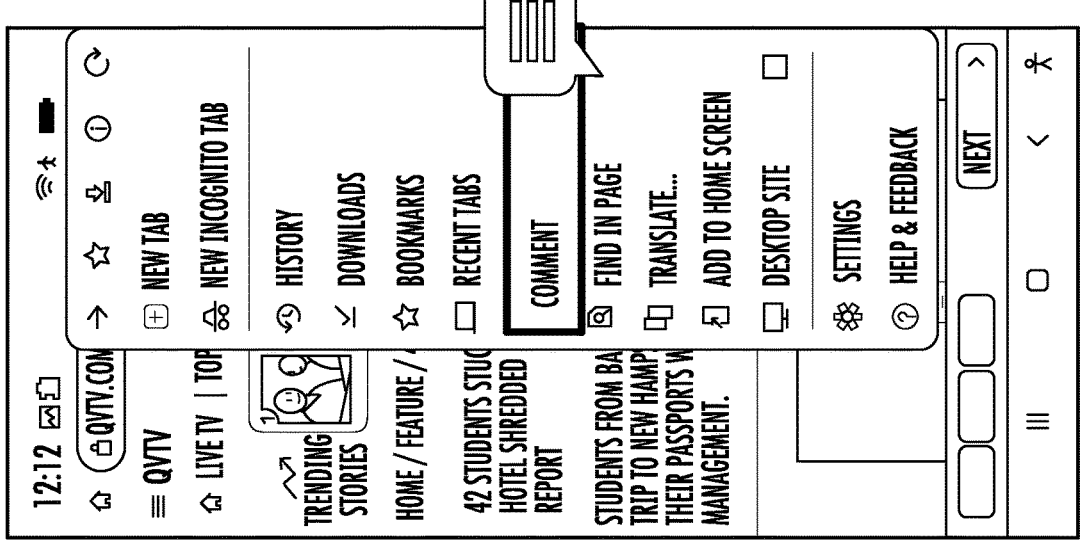
FIG. 6B

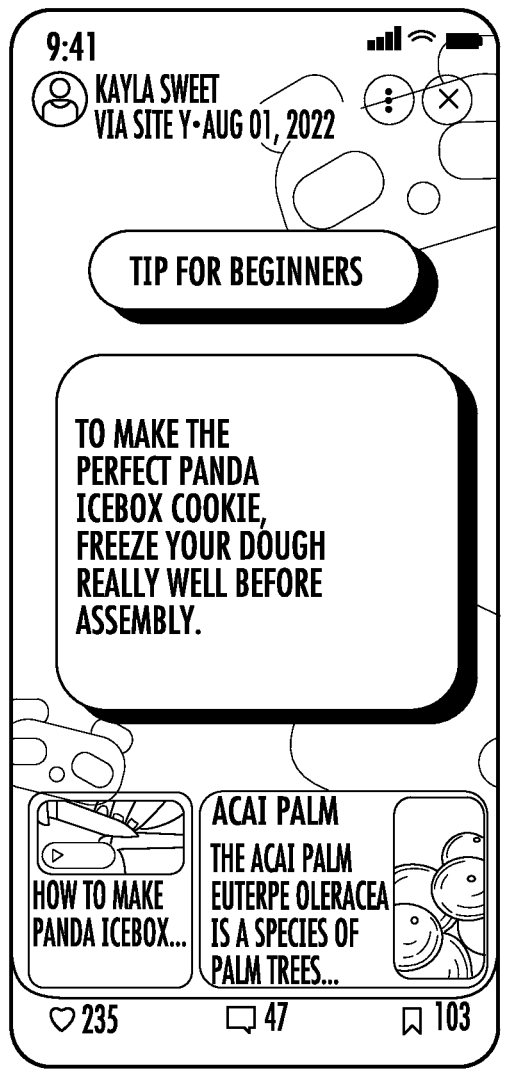
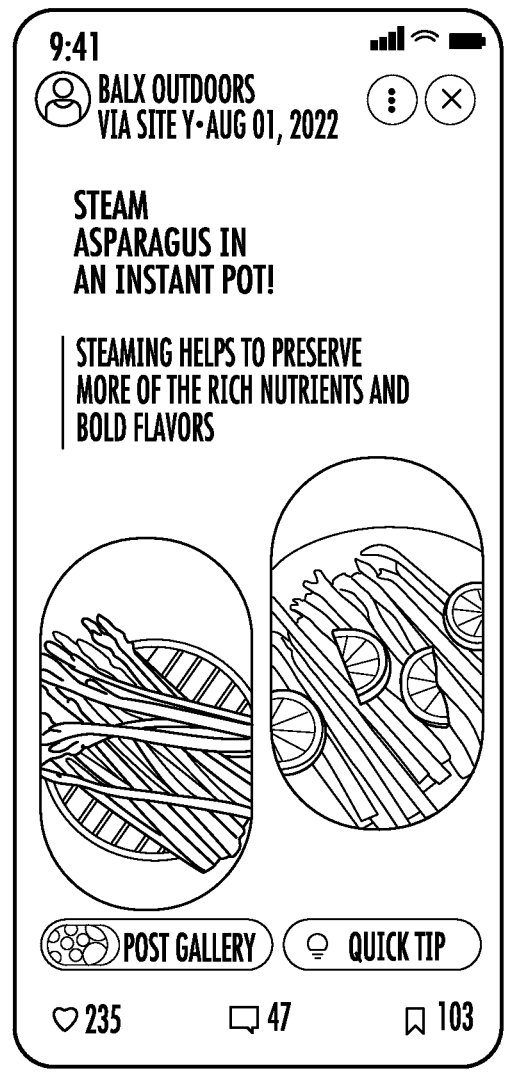
TEXT ON BACKGROUND  IMAGE + TEXT
FIG. 9A

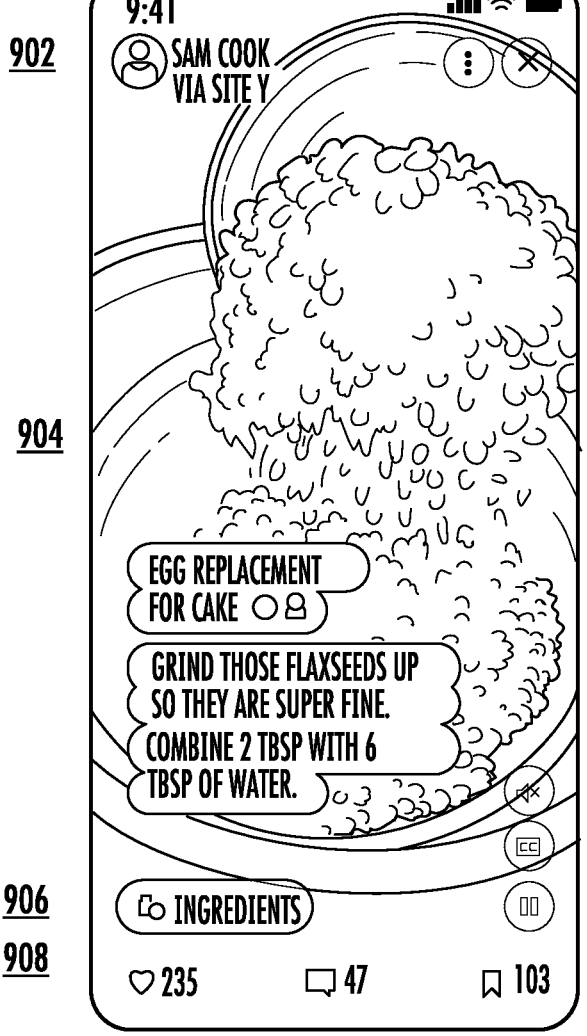
MULTIPLE PAGES  SHORT FORMAT VIDEO
FIG. 9B

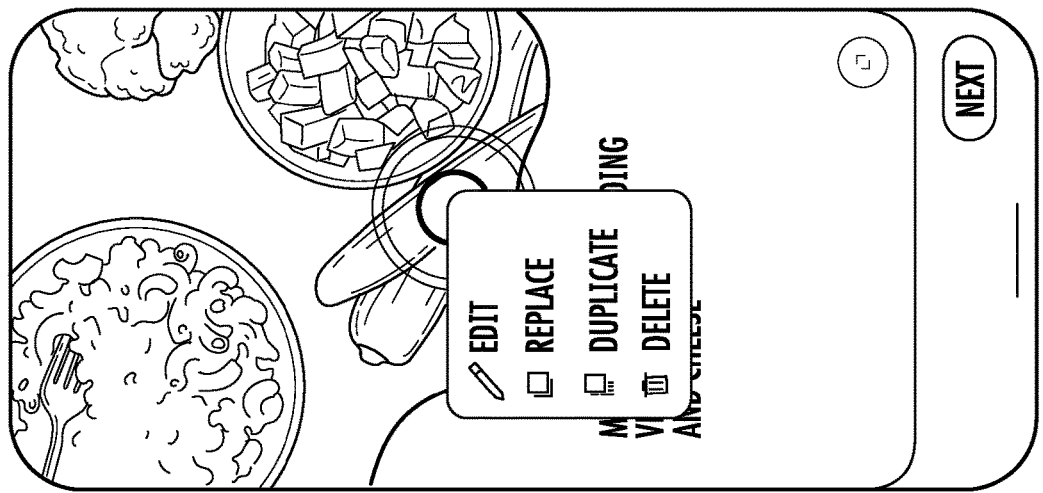
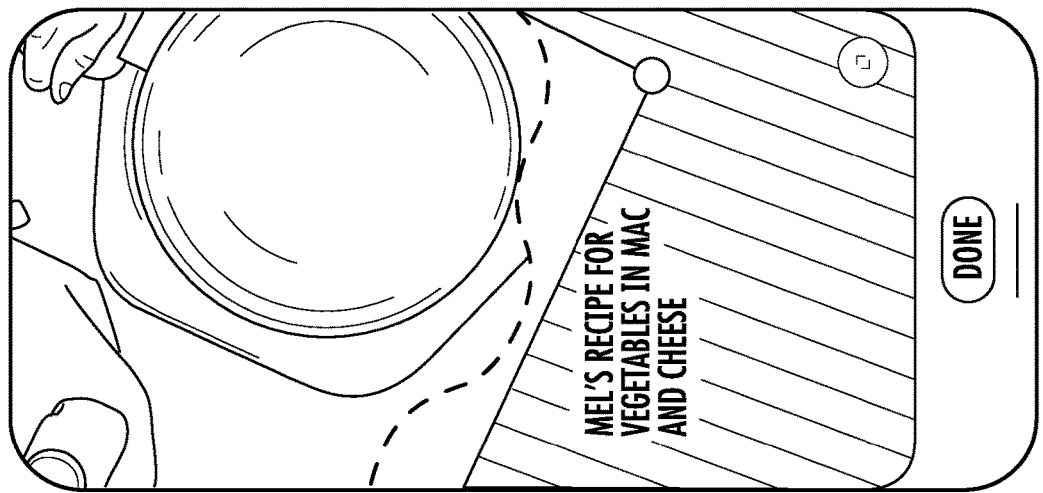
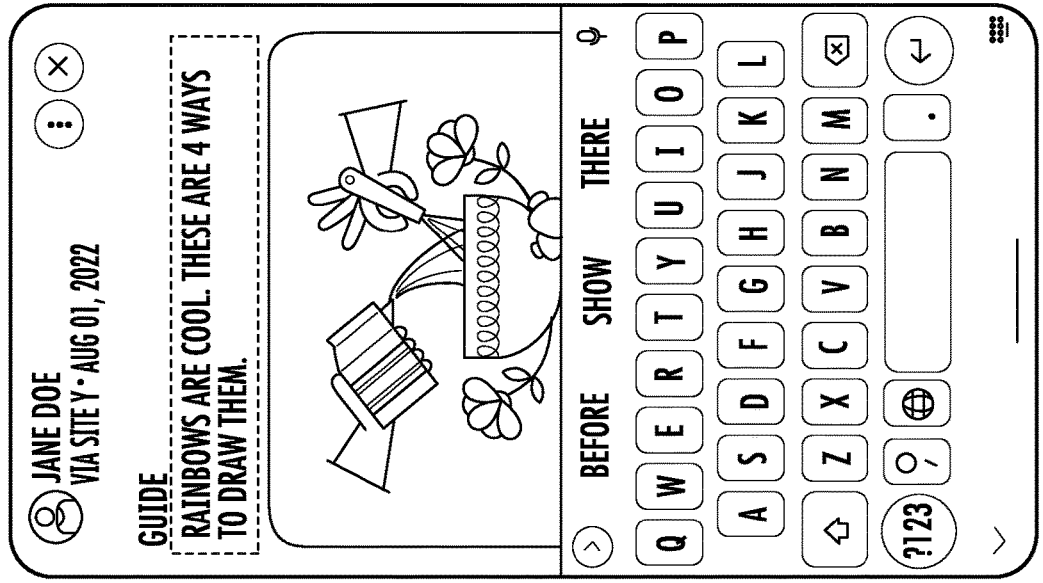
FIG. 9G

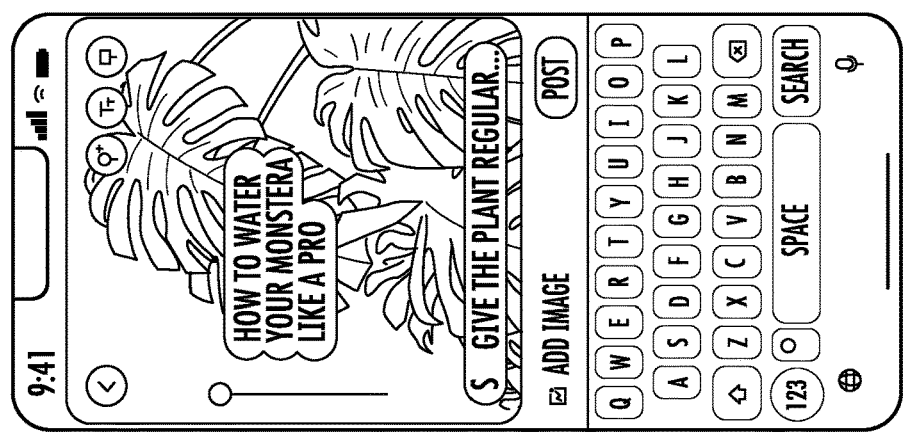
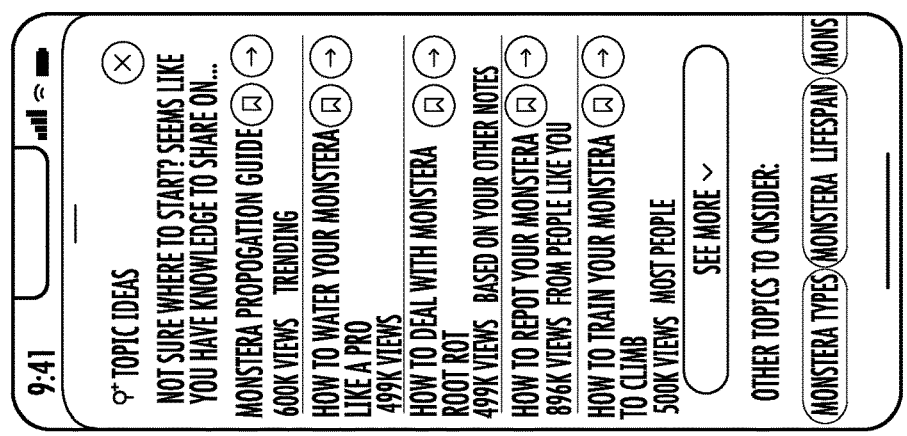
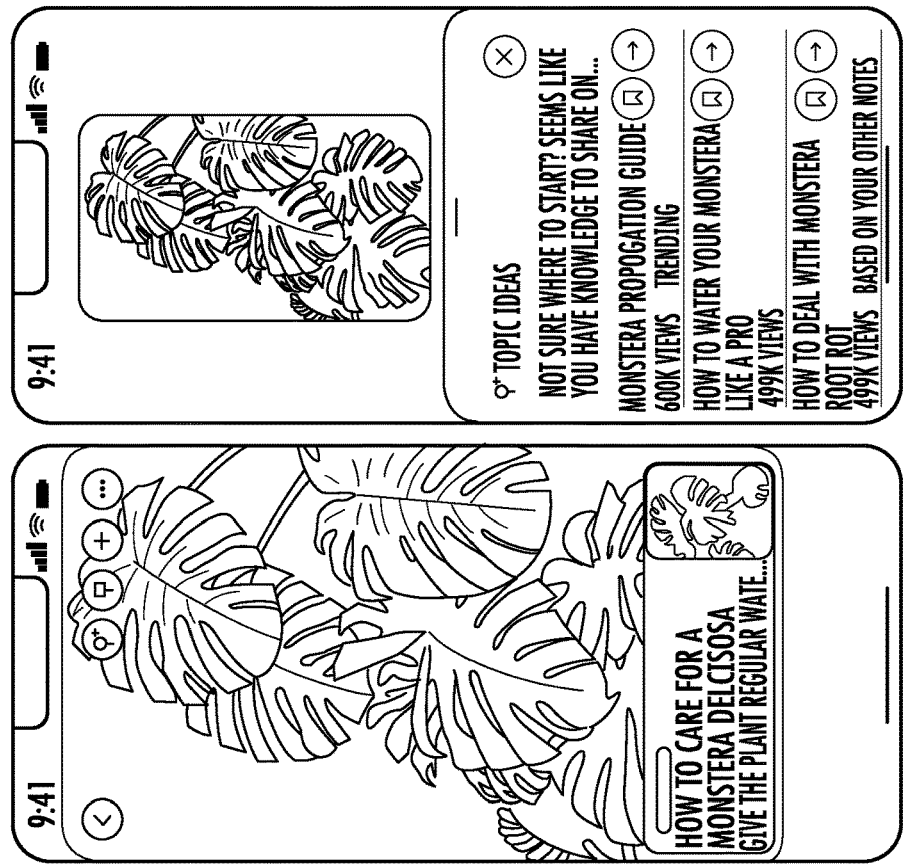
FIG. 10

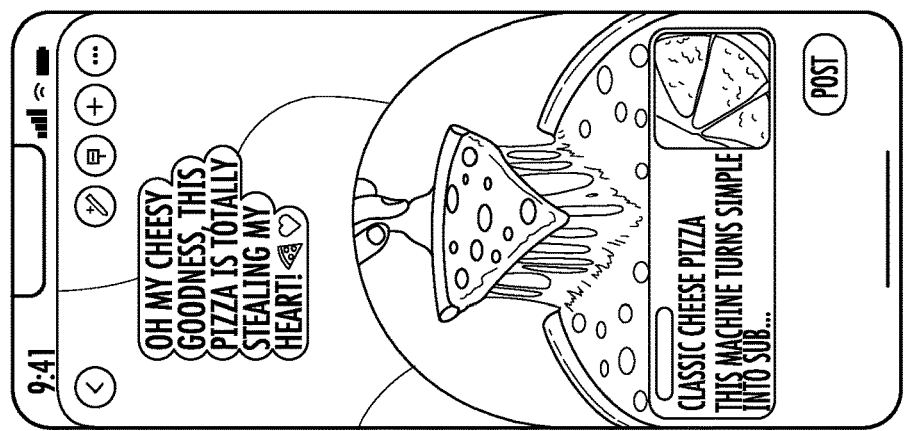
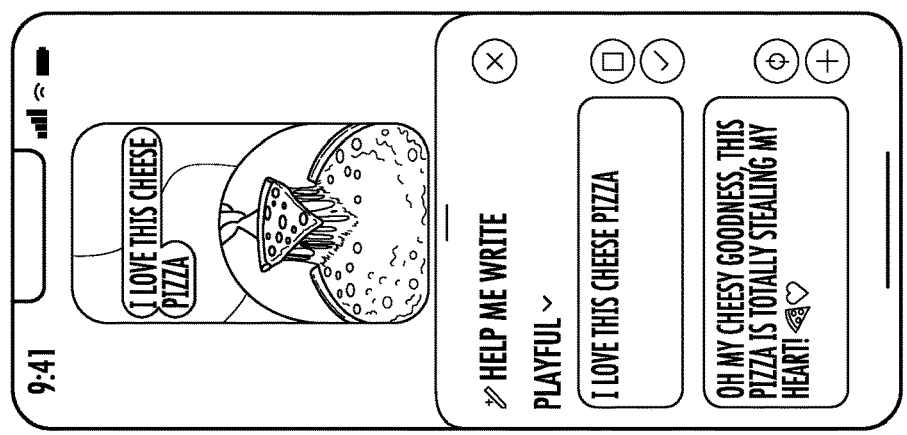
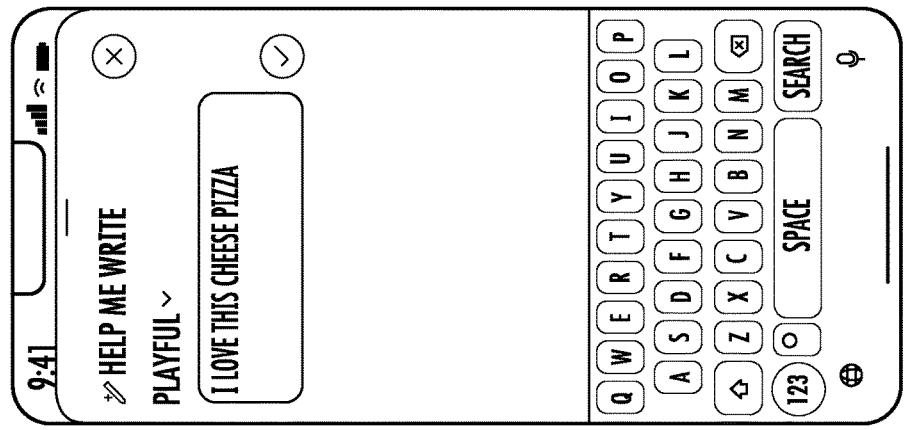
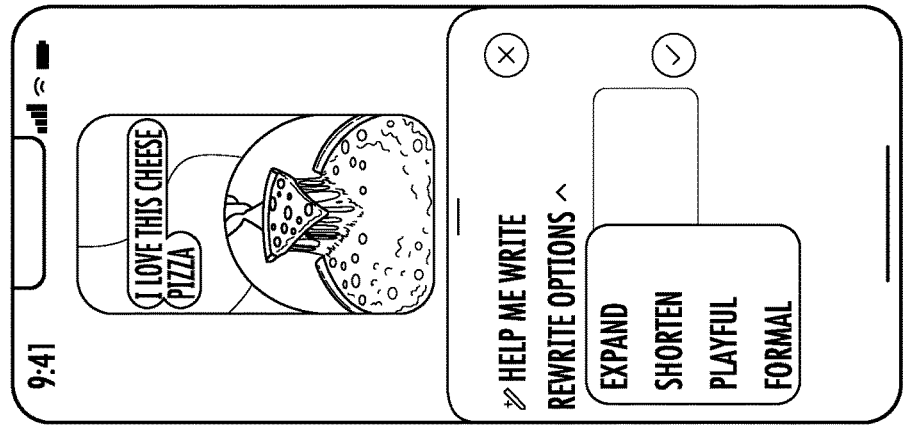
FIG. 11

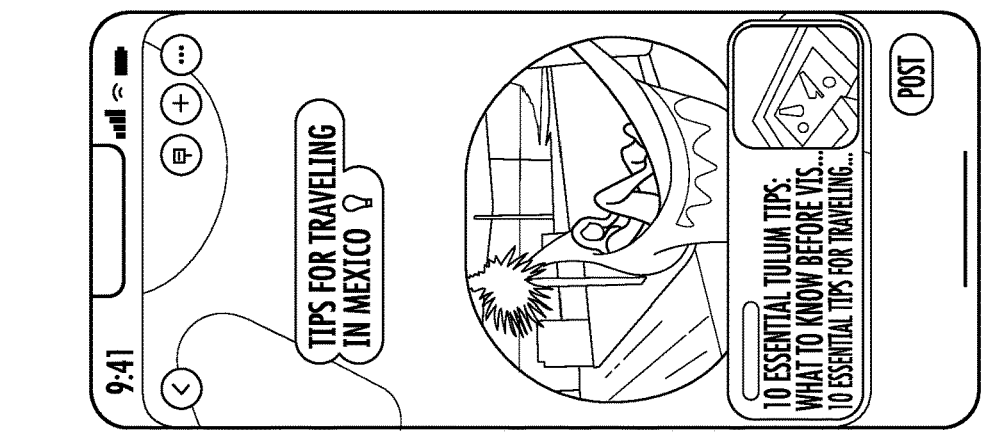
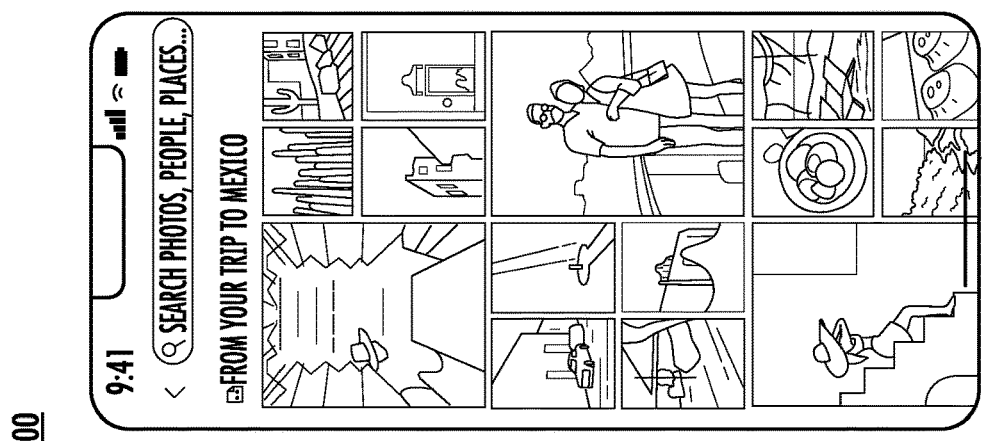
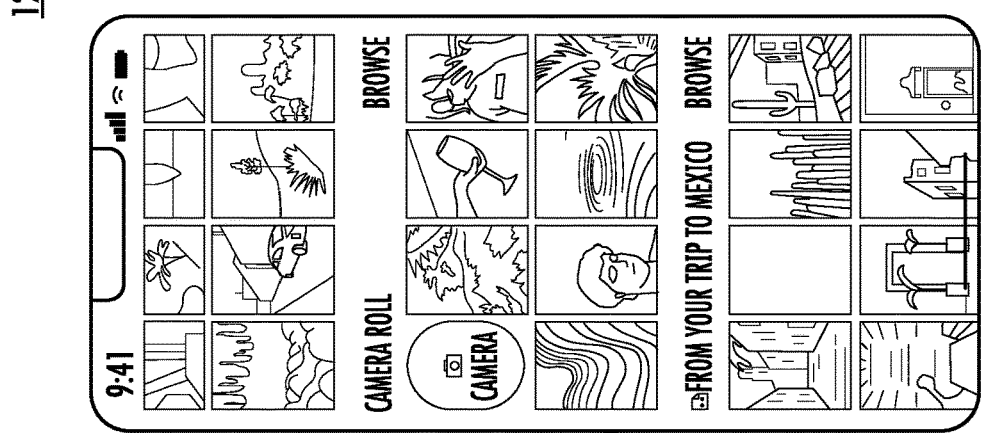
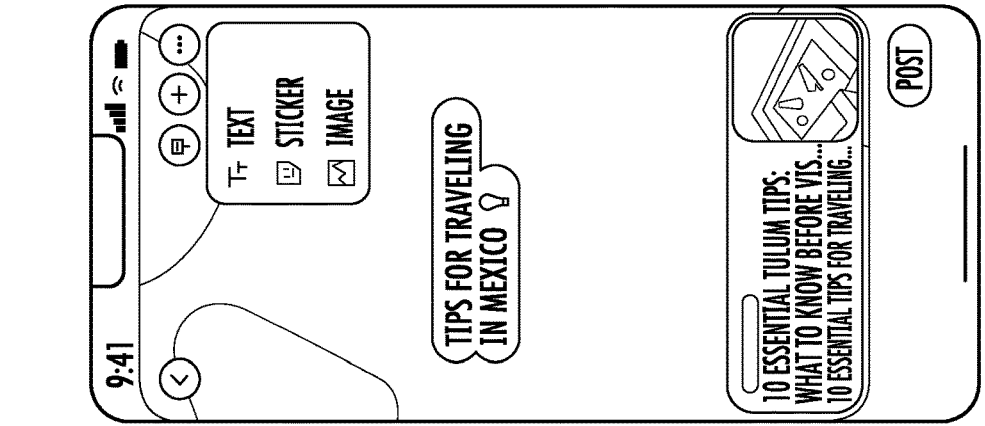
FIG. 12

GENERATING PROMPTS FOR USER LINK NOTES

RELATED APPLICATIONS

This application claims priority to and the benefit of U.S. Provisional Patent Application No. 63/596,484, filed Nov. 6, 2023. U.S. Provisional Patent Application No. 63/596,484 is hereby incorporated by reference in its entirety.

FIELD

The present disclosure relates generally to generating prompts for obtaining link notes. More particularly, the present disclosure relates to determining when and how to prompt users to provide notes on a link associated with a web resource that can then be provided to other users.

BACKGROUND

Understanding search results from a search results page can be difficult as titles and text snippets may provide limited information that may not be associated with the user's interest, which can lead to a time consuming web resource review that may not yield the desired information. Obtaining additional information on web resources can be difficult, which may include an additional search that may or may not identify relevant information.

Additionally, obtaining user insights can be difficult. In particular, users may struggle to determine which words to use. Additionally, the words may not be directed to a point-of-interest for other users and/or may not be abundant enough to generate desired results.

SUMMARY

Aspects and advantages of embodiments of the present disclosure will be set forth in part in the following description, or can be learned from the description, or can be learned through practice of the embodiments.

One example aspect of the present disclosure is directed to a computing system for comment prompt generation and input retrieval. The system can include one or more processors and one or more non-transitory computer-readable media that collectively store instructions that, when executed by the one or more processors, cause the computing system to perform operations. The operations can include obtaining content data. The content data can be associated with a web resource. The operations can include processing the content data with a generative model to generate a predicted prompt. The prompt can include a predicted text string associated with commenting on the web resource. The operations can include providing the predicted prompt for display with an input prompting interface. The input prompting interface can be configured to receive inputs. The operations can include obtaining comment input data from a user computing system via the input prompting interface. In some implementations, the comment input data can include a user-generated comment on the web resource. The operations can include storing data associated with the comment input data with data associated with the web resource. The data associated with the comment input data can be stored in a searchable database to be provided for display in response to the web resource being provided as a search result.

In some implementations, the operations can include obtaining user data. The user data can be associated with a particular user. The user computing system can be associated with the particular user. Processing the content data with the generative model to generate the predicted prompt can include processing the content data and the user data with the generative model. The user data can include user search history data. The generative model can generate the predicted prompt based on the particular user previously searching for information associated with a topic of the web resource. In some implementations, the user data can include user browser history data. The generative model can generate the predicted prompt based on the particular user previously viewing other web resources comprising information associated with a topic of the web resource. The operations can include generating a graphical card based on the user data, the content data, and the comment input data. The graphical card can include a user profile identifier for the particular user and data associated with the comment input data. The operations can include storing the graphical card. The graphical card can include a graphical background generated with an image generation model based on the comment input data.

In some implementations, the operations can include obtaining a search query, determining the web resources is associated with the search query, and providing a particular search result for display. The particular search results can include a link to the web resource, a title of the web resource, and data associated with the comment input data. Storing the data associated with the comment input data with the data associated with the web resource can include generating a web resource note and storing the web resource note with a plurality of other web resource notes associated with the web resource. In some implementations, the operations can include providing the web resource note and the plurality of other web resource notes in a notes interface that provides the web resource note and the plurality of other web resource notes in a plurality of graphical cards. The generative model can include an autoregressive language model. The generative model can be prompted to generate a question descriptive of a request for information on the web resource.

Another example aspect of the present disclosure is directed to a computer-implemented method for link note prompting. The method can include obtaining, by a computing system including one or more processors, context data. The context data can be associated with a particular content display instance. The particular content display instance can include a particular user viewing a particular content item. The method can include determining, by the computing system, an input request action based on the context data. The input request action can include providing an input entry interface to a user to obtain a user input. The method can include processing, by the computing system, the context data with a generative language model to generate a predicted prompt. In some implementations, the predicted prompt can include a natural language request for information generated based on the context data. The method can include providing, by the computing system, the predicted prompt in the input entry interface, and obtaining, by the computing system, user-generated content via the input entry interface. The method can include generating, by the computing system, a link note based on the user-generated content. The link note can be generated to be provided for display in a search results interface in response to the particular content item being determined as a search result.

In some implementations, the context data can be associated with a type of content being provided for display. The context data can be associated with the particular user associated with the particular content display instance. The context data can include search history data. The content being provided for display can be associated with a particular web resource. The context data can be associated with interaction data for a link of the particular web resource on a plurality of social network platforms. The input request action can be determined based on the interaction data. In some implementations, the context data can include user data and content data. The input request action can be determined based on a topic associated with content being provided for display being one of a plurality of topics the particular user is determined to have knowledge of based on the user data. The context data can include previous notes generated by the particular user. The predicted prompt can include a structure based on previous structures for the previous notes.

Another example aspect of the present disclosure is directed to one or more non-transitory computer-readable media that collectively store instructions that, when executed by one or more computing devices, cause the one or more computing devices to perform operations. The operations can include obtaining a first search query at a first time and determining a web resource is responsive to the first search query. The operations can include obtaining content data. The content data can be associated with the web resource. The operations can include processing the content data with a generative model to generate a predicted prompt. The prompt can include a predicted text string associated with commenting on the web resource. The operations can include providing the predicted prompt for display within an input prompting interface. The input prompting interface can include an input entry box. The operations can include obtaining comment input data from a user computing system via the input prompting interface. The comment input data can include user-generated content. The operations can include storing the user-generated content. The operations can include obtaining a second search query at a second time. The second time can differ from the first time. The operations can include determining the web resource is responsive to the second search query and providing the user-generated content in a search results interface with data descriptive of the web resource.

Another example aspect of the present disclosure is directed to a computing system for graphical card generation. The system can include one or more processors and one or more non-transitory computer-readable media that collectively store instructions that, when executed by the one or more processors, cause the computing system to perform operations. The operations can include obtaining card data. The card data can be descriptive of content in a graphical card. The content can be associated with one or more topics. The operations can include processing the card data to determine one or more entity tags associated with the content. The one or more entity tags can be associated with the one or more topics. The operations can include accessing a media content item database to obtain one or more media content items. The one or more media content items can be obtained based on determining the one or more media content items are associated with the one or more entity tags associated with the content. The operations can include providing the one or more media content items for display. The one or more media content items can be provided for display in an interactive user interface. The one or more media content items can be selectable to be inserted into the graphical card.

In some implementations, the graphical card can be associated with a link note. The link note can include user-generated content tagged to a particular web resource. The operations can include obtaining an input selection associated with the one or more media content items, generating an augmented graphical card, and providing the augmented graphical card for display. The augmented graphical card can include at least a portion of the content of the graphical card and at least a portion of the one or more media content items. In some implementations, the operations can include obtaining an adjustment input. The adjustment input can be associated with a request to augment the augmented graphical card. The operations can include generating an updated graphical card based on the adjustment input. The updated graphical card can include the augmented graphical card with one or more adjustments. The operations can include providing the updated graphical card for display. The one or more adjustments can include at least one of a layout change of the augmented graphical card, a cropping change for the one or more media content items, a size change for one or more content items, a color change, or template change.

In some implementations, the media content item database can include a user-specific database. The user-specific database can be associated with a particular user. The particular user may have generated at least a portion of the content. In some implementations, the user-specific database can include an image gallery associated with the particular user. The image gallery can be stored on a server computing system associated with a particular content item storage platform. In some implementations, the user-specific database can include a local storage database of a user computing device. The media content item database can include a plurality of media content items. In some implementations, the plurality of content items may have been preprocessed to generate a plurality of respective metadata sets.

Another example aspect of the present disclosure is directed to a computing system. The system can include one or more processors and one or more non-transitory computer-readable media that collectively store instructions that, when executed by the one or more processors, cause the computing system to perform operations. The operations can include providing an input drafting interface for display. The input drafting interface can include a graphical user interface comprising a plurality of attribute options and a text input box. The plurality of attribute options can be associated with a plurality of candidate attributes for content item generation. The operations can include obtaining, via the input drafting interface, a selection of a particular attribute option of the plurality of attribute options. The particular attribute option can be associated with a particular candidate attribute. The operations can include obtaining a text input via the text input box of the input drafting interface. The text input can be associated with a prompt intent for the content item generation. The operations can include processing the particular attribute option and the text input with a generative model to generate a model-generated content item. The mode-generated content item can include the particular candidate attribute. In some implementations, the model-generated content item can be associated with the prompt intent. The operations can include providing, via the input drafting interface, the model-generated content item for display.

In some implementations, the operations further can include obtaining an input selection via the input drafting interface and generating an augmented graphical card based on the input selection. The augmented graphical card can include a graphical card augmented to include the model-generated content item. The operations can include providing the augmented graphical card for display. The plurality of candidate attributes can include a plurality of different styles. The plurality of different styles can be associated with at least one of a plurality of different artistic styles or a plurality of different writing styles.

In some implementations, the plurality of candidate attributes can include a plurality of different tones. The plurality of different tones can be associated with at least one of a plurality of different sentiments or a plurality of different pacing types. In some implementations, the generative model can be obtained from a generative model database based on the selection of the particular attribute option. A particular attribute soft prompt can be obtained based on the selection of the particular attribute option. The particular attribute soft prompt can include a set of learned parameters. The set of learned parameters can be processed with the generative model to generate the model-generated content item.

In some implementations, the first search query and the second search query may differ. The comment input data can include multimodal data. The multimodal data can include text data and image data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 depicts illustrations of example prompts according to example embodiments of the present disclosure.

FIG. 5C depicts an illustration of example predicted prompts according to example embodiments of the present disclosure.

FIGS. 6A-6C depict illustrations of example link note entry points according to example embodiments of the present disclosure.

FIGS. 9A-9G depict illustrations of example graphical card interfaces according to example embodiments of the present disclosure.

FIG. 10 depicts an illustration of an example card generation interface according to example embodiments of the present disclosure.

FIG. 11 depicts an illustration of an example content item generation interface according to example embodiments of the present disclosure.

FIG. 12 depicts an illustration of an example image suggestion interface according to example embodiments of the present disclosure.

Figure 1:
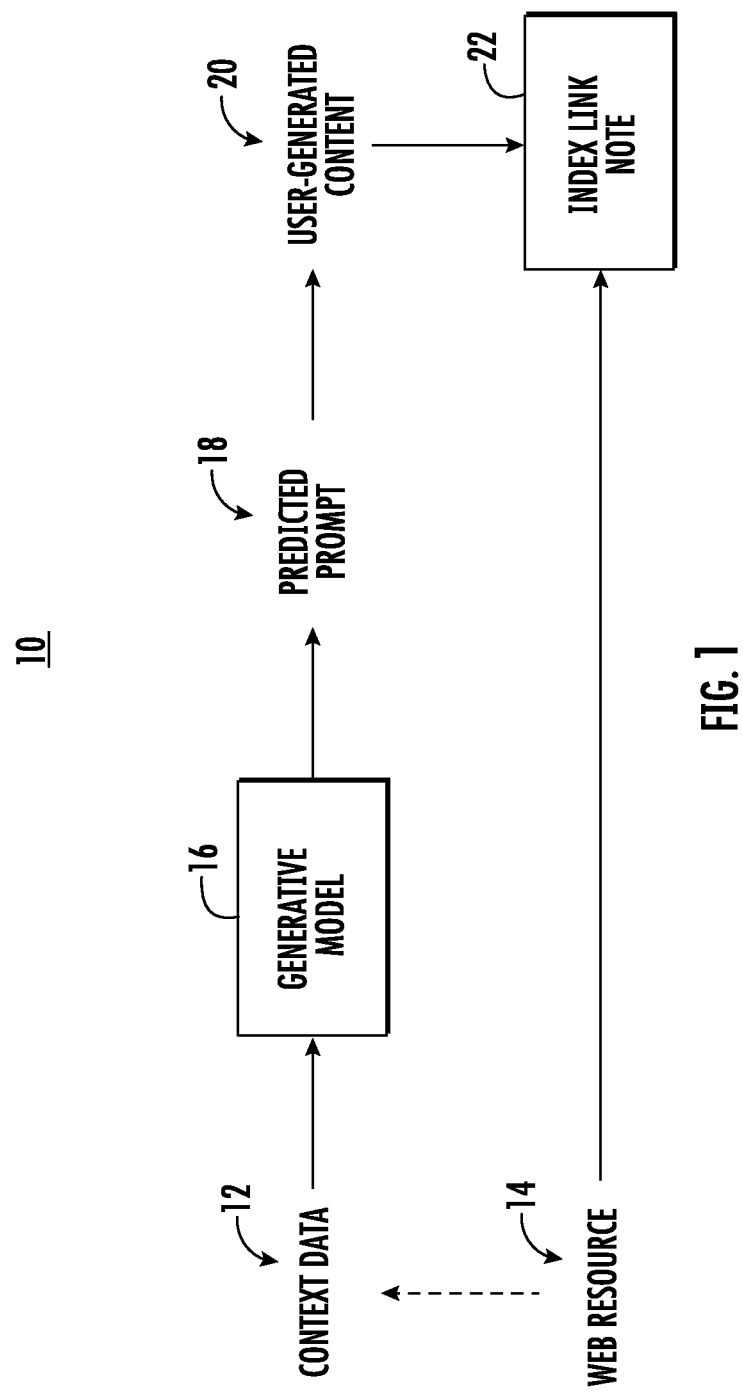
FIG. 1 depicts a block diagram of an example link note generation system according to example embodiments of the present disclosure.

Reference numerals that are repeated across plural figures are intended to identify the same features in various implementations.

DETAILED DESCRIPTION

Generally, the present disclosure is directed to generating prompts for user data entry. In particular, the systems and methods disclosed herein can leverage context determination (e.g., determining a context a user is likely to provide a note and/or determining a comment gap and/or content gap for a particular link) to determine an input entry interface (e.g., a link note input entry interface) is to be provided and can leverage a generative model (e.g., a large language model) to generate a prompt based on user data (e.g., user search history and/or user browsing history) and/or content data (e.g., the topic of the content and/or the type of content). For example, a user may be prompted in a search results page, during web resource review, and/or upon next search instance to provide a note on a particular web resource (and/or other content item). A prompt can be generated based on previous user notes, previously viewed content, the topic of the content, and/or the type of content to provide the user with a prompt that requests information in a format that causes insightful note generation.

Link notes can provide additional information on a web resource without reviewing the web resource, and the link notes can be provided by other users. The systems and methods can determine when to provide link notes prompts to users based on contexts determined to be associated with valuable note intake. For example, particular users may provide more trustworthy and/or more detailed information on a particular topic based on previously obtained knowledge and/or based on previously generated notes. Additionally and/or alternatively, particular content types may be determined to be associated with user commenting and/or user confusion.

The prompt provided to the user can "inspire" a user to provide more detailed information and/or may direct a user to leave a note on a particular topic and/or feature of the web resource. A generative model can process user data and/or content data to generate a predicted prompt. In particular, the generative model can leverage a user's search history, a user's browsing history, a user's previous notes, and/or other user data to generate suggested notes, a question to prompt response, and/or a note template. Alternatively and/or additionally, the generative model can leverage semantic understanding of the web resource, topic classification, content type classification, other notes associated with the web resource, and/or other content data to generate suggested notes, a question to prompt response, and/or a note template.

An input entry interface can provide the predicted prompt to a user. The input entry interface can then obtain inputs (e.g., comment input data) from a user to generate user-generated content descriptive of a link note. In some implementations, a graphical card can be generated based on the link note. The graphical card can include the user-generated content of the link note, user profile identifiers (e.g., a name and/or an image), link information, and/or a graphical background. The link note and/or the graphical card can be stored with an association with the web resource. The stored link note and/or graphical card can then be obtained in response to one or more users searching for the web resource and/or one or more users interacting with a notes interface.

Understanding search results from a search results page can be difficult as titles and text snippets may provide limited information that may not be associated with the user's interest, which can lead to a time consuming web resource review that may not yield the desired information. Additionally and/or alternatively, obtaining additional information on web resources can be difficult, which may include an additional search that may or may not identify relevant information. Social media posts, blog posts, and/or reviews of the web resource and/or an entity associated with the web resource may lack detail, may be misdirected, and/or may lack context and/or perspective.

Link notes (e.g., link notes obtained from users and/or link notes generated by a generative model) can provide additional information on a web resource, which may inform other users of a relevancy to their request. The link notes can be provided in a search results page and/or may be displayed in a notes interface that can be accessed from a search results page and/or from the web resource. Link notes can be provided in graphical cards, in a text panel in-line with a text snippet, and/or in other formats.

Determining when and how to prompt users for note generation can be based on a note disparity determination (e.g., are there a large number of notes on a blog platform and/or a social media platform with regards to the article, but relatively few in the notes interface of the search platform), a user-specific interest determination (e.g., is this resource similar to other articles viewed by the user in the past), resource trends (e.g., has the resource and/or similar resources been commented on previously), a note-worthy resource determination (e.g., would a note provide utility?), and/or other determinations. The prompt may be generated based on generative language model processing, which can include processing previous notes (e.g., other notes by the user and/or other users), processing the search query, processing the web resources, and/or processing other data.

Link note prompting can be utilized to initiate and/or instigate collection of information on a web resource that can then be provided to other users, which can identify user opinions, user summaries, and/or other user identified details. The obtained notes can then be provided in a search results interface and/or a discover feed. Link note prompting can be determined based on a note disparity determination, a user-specific interest determination, resource trends, a note-worthy resource determination, and/or other determinations.

Obtaining additional information from other users can be useful to users for determining the topic and quality of search results that may not be discernible from traditional search result displays; however, obtaining helpful and detailed information can be difficult. Determining when to prompt a user for note generation and generating a context-aware prompt can be leveraged to provide an interface that obtains detailed information from relevant users.

Motivating users to contribute information (e.g., comments, reviews, insights, etc.) when they see search results can be difficult. A prompt generation system can be leveraged to target the right users with the right prompt at the right time/place, based on insights. In particular, the prompting can help create posts with desired characteristics (e.g., a desired level of detail, on a desired topic, and/or other characteristics). The prompt generation system disclosed herein can promote particular users to generate (or create) a note and/or can promote particular web resources (and/or content items) to generate (or create) a note for via the prompt generation system.

In some implementations, the systems and methods disclosed herein can be leveraged for prompting users to generate stand alone content. The stand alone content can include user recipes, user tutorials, user graphics, life updates, link shares, and/or other user-generated content. The stand alone content can be generated in freeform and/or based on the model-generated prompt. In some implementations, one or more machine-learned models can be utilized to generate content templates and/or may be utilized to augment user provided content (e.g., restructuring and/or restyling text, images, audio, interface elements, and/or video).

In some implementations, the link notes and/or interactions with the link notes may be utilized to adjust web resource rankings, web resource tagging, web resource embedding, and/or web resource indexing. For example, in some implementations, the link notes can be processed to determine the quality of the web resource. The quality determination may be determined based on processing the link notes with one or more machine-learned models (e.g., a sentiment analysis model, a language model, a classification model, etc.). The link notes may be processed with one or more machine-learned models to determine topics associated with the web resource, determine biases of the web resource, utility of the web resource, and/or the direction of the web resource. The link notes may be utilized for suggesting additional content, may be embedded for embedding based searches, and/or may be utilized for query suggestions.

Link notes in the notes interface may be ranked and/or displayed based on interactions, machine-learned model determined quality, responsiveness to a query, a level of detail, and/or other attributes. In some implementations, link notes generated by a user may be provided to all other users, only users within the user's social network, and/or only user's determined to be associated with the user based on interests, location, and/or activity.

Link notes can be utilized for a plurality of different content items and may not be limited to web resources. For example, the systems and methods disclosed herein can be utilized to generate prompts and/or interfaces for obtaining, inspiring, and/or generating link notes for local files (e.g., on-device documents, images, videos, etc.), intranet files, and/or other content item sources, which may include folders on an external drive, documents on the cloud, etc.

In some implementations, the input interface can include an open ended input interface that provides one or more options for providing user inputs. Alternatively and/or additionally, the input interface can include a plurality of features and/or options for generating user-generated content, which may be utilized for link notes and/or stand alone content. The input interface can include an independent content item user interface that can enable a user to add images, links, and/or different template types of content and can be interactive. The interactive user interface can include image suggestion, template suggestion, text suggestion, layout suggestion, link suggestion, widget suggestions, template suggestion, and/or other options (e.g., other types of suggestions).

Image suggestion can include processing user input text, data associated with the web resource, a generated prompt, a stock photos library, and/or an image database associated with the user (e.g., an online image gallery associated with the user and/or local images on a user computing device) to determine images that are relevant for the particular context (e.g., relevant to the user input, the web resource, and/or the generated prompt). The image suggestion can include determining one or more entities, topics, and/or features associated with the web resource and/or the user's input, then processing the stock photos gallery and/or the image database(s) associated with the user to determine one or more particular images that are associated with the one or more entities, topics, and/or features associated with the web resource and/or the user's input. For example, if the web resource discusses a pasta recipe, the stock image gallery and/or the user image gallery may be searched for images depicting pasta, cooking, pasta ingredients, and/or the kitchen. Another example can include determining the text of the generated prompt may be associated with a Mexico trip, and one or more images from the user's image gallery can be identified and suggested based on location metadata, feature detection, optical character recognition, and/or other determination techniques that can be utilized to identify the one or more images are associated with a Mexico trip. In some implementations, image suggestions can be based on generating a prompt embedding and/or a web resource embedding then performing an embedding search based on a plurality of image embeddings associated with the one or more image databases. The suggestion determination and display may be performed for images, videos, document files, audio, text data, templates, and/or other data.

Additionally and/or alternatively, the interactive input interface can include a "Help Me Write" feature. The "Help Me Write" feature can be a selectable user interface feature that can provide a generative language model interface for generating text for the user-generated content. The "Help Me Write" feature can include a dropdown menu to select a particular tone, style, format, length, and/or other attribute for the model-generated text. The "Help Me Write" feature can process a user input to adjust and/or change the style, tone, format, language, lexicon, length, and/or level of simplicity of the input text. For example, a user may select a tone from a plurality of tone options, enter a text string, and the input interface can provide the text string and the selected tone prompt to a generative language model (e.g., a large language model) to generate a model-generated text response that can then be utilized for the user-generated content (e.g., the link note and/or the sand alone content). Alternatively and/or additionally, the input interface can interface with different generative language models associated with different attributes in response to the selection of a different attribute option. The different generative models may be trained and/or tuned for the particular attribute.

The systems and methods of the present disclosure provide a number of technical effects and benefits. As one example, the system and methods can provide an interactive user interface that can be utilized to generate prompts and obtain user input data. In particular, the systems and methods disclosed herein can leverage one or more machine-learned models to determine when to request a link note and generate a prompt for requesting information. For example, a generative model can process user data, content data, and/or other context data to determine a request for information action is to be performed. Additionally and/or alternatively, the generative model may generate a prompt to request information based on the user data, content data, and/or other context data. The prompt can be provided to the user, a user input can be received, and a link note may be generated and stored.

Another technical benefit of the systems and methods of the present disclosure is the ability to leverage user data and content data to determine which users may provide trustworthy information on a particular web resource and/or to determine when to prompt a user to provide information. For example, a user can be determined to be knowledgeable on a particular topic and/or be a common note poster for a given type of content. Based on the determination, the user may be prompted to provide a link note for a given web resource. Alternatively and/or additionally, the topic of the content, the type of content, and/or other interactions with the content can be utilized to determine the web resource is "ripe" for commenting. The prompt may be generated with a generative model to provide a prompt that is both user-aware and content-aware.

The systems and methods disclosed herein addresses a problem generated by computing systems obtaining, processing, and transmitting data from a plurality of databases from a plurality of sources. The immense volume of data available to users can provide potential for misinformation, misdirection, and/or lack of verification. Text snippets, titles, and/or example images in a search results interface may provide some details on contents of a web resource; however, information from other users can provide further insight on topic, trustworthiness, and/or what to expect, which can be leveraged to reduce instances of irrelevant web resources being navigated and reviewed by the user.

Another example of technical effect and benefit relates to improved computational efficiency and improvements in the functioning of a computing system. For example, the systems and methods disclosed herein can leverage note generation to provide an interface that provides information on links that may mitigate tedious search result review by providing user-based validation. The reduced volume of follow-up queries and the reduced volume of page redirects can reduce latency at the user device and can reduce search engine computational cost. With reference now to the Figures, example embodiments of the present disclosure will be discussed in further detail.

FIG. 1 depicts a block diagram of an example link note generation system 10 according to example embodiments of the present disclosure. In some implementations, the link note generation system 10 is configured to receive, and/or obtain, context data 12 descriptive of a user data, content data, and/or other context data associated with a web page and/or a viewing stance and, as a result of receipt of the context data 12, generate, determine, and/or provide a predicted prompt 18 that is descriptive of a generated natural language request for information from a user. Thus, in some implementations, the link note generation system 10 can include a generative model 16 that is operable to process the context data 12 to generate a predicted prompt 18 that includes a text string descriptive of a question, a command, a template, and/or a suggested comment.

In particular, the link note generation system 10 can obtain context data 12. The context data 12 can include user data (e.g., data associated with a user viewing the search results page, entered the search query, and/or viewing the discover feed), content data (e.g., data associated with content in a web resource 14), and/or other context data (e.g., a time, query trends, comment trends, news, etc.). The context data 12 can include user search history data, user browsing history data, user purchase history data, user profile data, user note history data, topic label data for the web resource, content type label for the web resource, other notes on the web resource, and/or other data. The context data 12 may be generated with a personalized machine-learned model and/or one or more other machine-learned models.

The context data 12 may be obtained based on a web resource 14 being provided for display, being previously reviewed, and/or being associated with a search result in a search results page. The context data 12 may be obtained and/or generated based on one or more user interactions, one or more global trends, and/or based on the web resource 14 being associated with a particular type of content (e.g., an editorial, a tutorial, a blog, a news article, a sports score tracker, etc.).

A generative model 16 (e.g., an autoregressive language model, a diffusion model, and/or one or more other generative models) can process the context data 12 to generate a predicted prompt 18. The generative model 16 can include a language model (e.g., a large language model, a vision language model, and/or other language models), a text-to-image generation model, and/or other generative models. The predicted prompt 18 can include text data, image data, audio data, latent encoding data, and/or multimodal data. The predicted prompt 18 can include a question that may be responded to by the user, a template for drafting a note, and/or one or more selectable note options. For example, the predicted prompt 18 can include a question generated based on semantic analysis and/or topic determination for the web resource, can include a template generated based on previously generated notes by the particular user and/or other users, and/or selectable note options based on previous comments provided for similar web resources. In some implementations, the predicted prompt 18 can be descriptive of a request for a particular type of information about the web resource 14. Alternatively and/or additionally, the predicted prompt 18 can be descriptive of general information on the web resource 14. The predicted prompt 18 can include a novel text string not previously provided by the user and/or in relation with the web resource 14. The predicted prompt 18 can include a plurality of predicted characters, words, pixels, signals, and/or structure.

The predicted prompt 18 can be provided for display in an input entry interface. A user can interact with input entry interface to generate user-generated content 20 that can be transmitted to a server computing system (e.g., a search engine computing system). The user-generated content 20 can include text data, image data, audio data, video data, latent encoding data, and/or multimodal data. The user-generated content 20 can be descriptive of a note on the web resource 14. The note can be descriptive of commentary, an opinion, a review, a verification, and/or an indication of quality and/or topic. The user-generated content 20 can include the note displayed in a graphical card with one or more graphics, one or more widgets, one or more links, one or more media content items, and/or a graphical background.

The link note generation system 10 can index the link note 22 with the web resource 14. The indexing can be leveraged to provide the user-generated content 20 including the link note for display when providing a search result for the web resource 14. Alternatively and/or additionally, the user-generated content 20 can be stored in a note database to be displayed in a notes interface when selected by one or more users.

Figure 2:
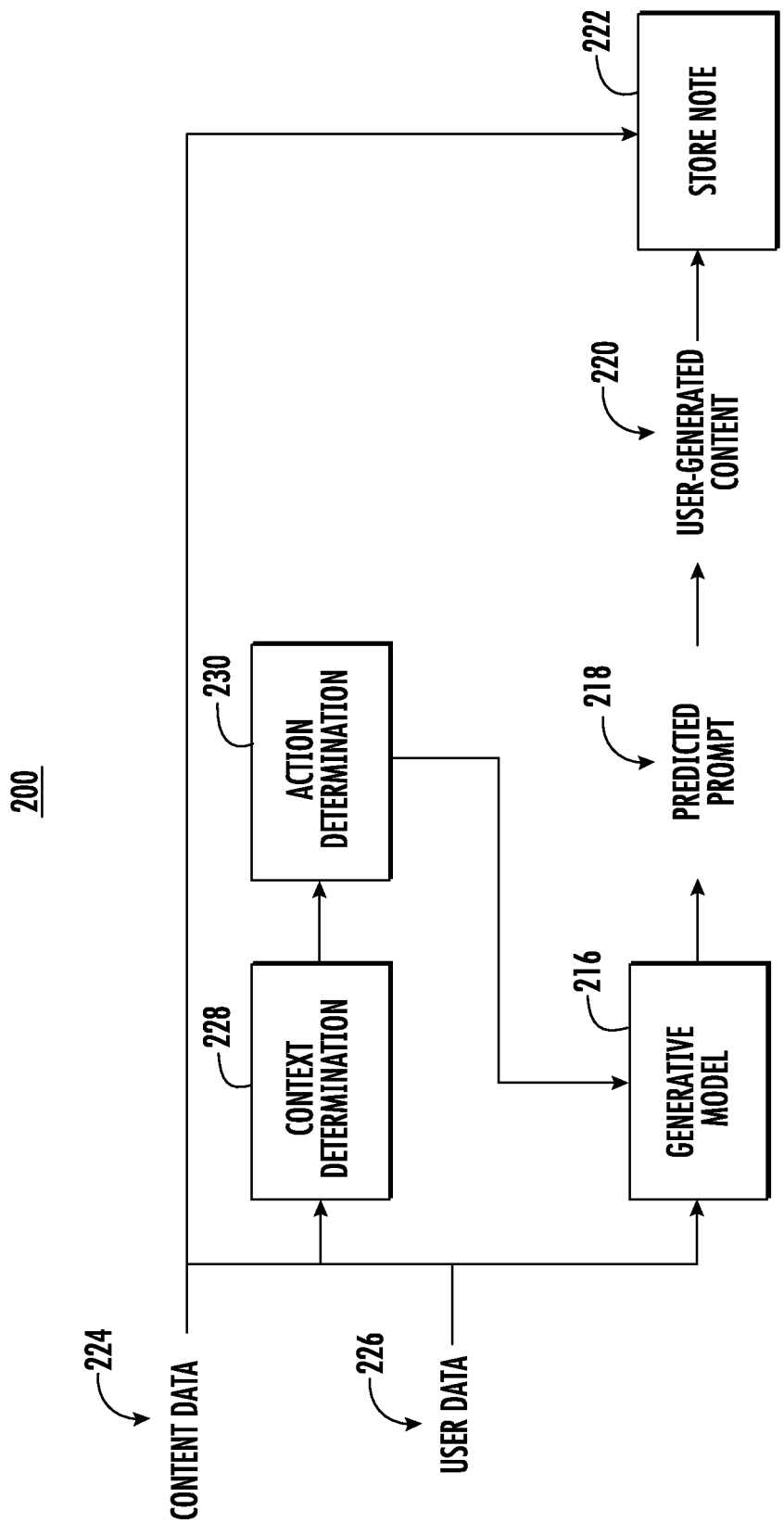
FIG. 2 depicts a block diagram of an example user prompting system according to example embodiments of the present disclosure.

FIG. 2 depicts a block diagram of an example user prompting system 200 according to example embodiments of the present disclosure. The user prompting system 200 is similar to link note generation system 10 of FIG. 1 except that the user prompting system 200 further includes an action determination block 230.

The user prompting system 200 can obtain content data 224 and user data 226. The data can be obtained in response to a search query, an on-back event to a search results page (e.g., returning to the search results page after viewing the web resource), a next search instance, a next instance of the web resource being a search result, and/or based on other trigger events. The content data 224 can be descriptive of the content in the web resource, which can include text, images, videos, layout, audio files, transitions, latent encoding data, related links/web resources, interaction history for the web resource, and/or other data associated with the web resource and/or other similar web resources. The user data 226 can include data descriptive of a user search history (e.g., log of previous queries obtained from the user), a user browsing history (e.g., a log of previously visited web pages and/or platforms), a user application history (e.g., a log of previously interacted with applications), a user purchase history (e.g., a log of previously obtained products and/or services), a user profile (e.g., user identifiers, user preferences, user titles, user accounts, and/or user contacts), note history (e.g., a log of previously provided/generated notes), and/or social media networks and/or activities.

The content data 224 and/or the user data 226 can be processed with a context determination block 228 to determine a context. Context determination block 228 can include one or more machine-learned models and/or one or more deterministic functions. The context determination block 228 can generate context data.

The context data can be processed with an action determination block 230 to determine an input request action is to be performed. The action determination block 230 can include one or more machine-learned models and/or one or more deterministic functions. The context determination and/or the action determination may be performed based on heuristics.

The input request action may include generating a prompt and providing an input entry interface to a user with the prompt to obtain a link note for a given web resource. The input request action may be determined based on a user's likelihood to respond, a user's trustworthiness, a user's experience, a user's knowledge, a user differing in associations from previous note providers, a content gap descriptive of a difference in notes for the particular web resource versus similar web resources, a comment gap descriptive of a difference between interactions with the link on one or more blogs or social media platforms versus a volume of notes, the topic of the web resource, the topic of the search, the content type, the intent of the content, and/or other data.

Particular content types (e.g., news articles, short stories, movies, skits, blog posts, and/or social media posts) may be determined to be more likely to be interacted with for link note generation and/or may be determined to receive more benefit from a link note. Additionally and/or alternatively, the interactions with a web resource on other platforms may be determined. If the volume and/or quality of interactions on other platforms is determined to meet a threshold difference in comparison to the present platform, the input request action may be determined more often. For example, the threshold for the input request action may be adjusted based on interactions on other platforms. Alternatively and/or additionally, the threshold may be adjusted based on search and/or view trends associated with the web resource.

The input request action may be performed immediately following the determination and/or may be provided as a "nudge" at a later time, which may be a determined time of higher likelihood of response (e.g., when a user is at a particular location (e.g., home), when a user's calendar is empty, a particular time of day of increased phone activity, and/or upon the next user search instance). The "nudge" may be provided via a device notification, an email, and/or an application-based notification.

The user prompting system 200 can then leverage the context data to generate a prompt for requesting a note from the user based on the input request action determination. The context data can include the user data 226 (e.g., data associated with a user viewing the search results page, entered the search query, and/or viewing the discover feed), the content data 224 (e.g., data associated with content in a web resource), and/or other context data (e.g., a time, query trends, comment trends, news, etc.). The context data can include user search history data (e.g., a list of search queries previously searched, which may include queries associated with the same topic as the web resource), user browsing history data (e.g., a list of web pages previously viewed, which may include web pages associated with the same topic as the web resource), user purchase history data, user profile data (e.g., a user's name, occupation, education, preferences, etc.), user note history data, topic label data for the web resource, content type label for the web resource, other notes on the web resource, and/or other data. The context data may be generated with a personalized machine-learned model and/or one or more other machine-learned models.

The context data may be obtained based on a web resource being provided for display, being previously reviewed, and/or being associated with a search result in a search results page. The context data may be obtained and/or generated based on one or more user interactions, one or more global trends, and/or based on the web resource being associated with a particular type of content (e.g., an editorial, a tutorial, a blog, a news article, a sports score tracker, etc.).

A generative model 216 (e.g., a text generation model, an image generation model, an audio generation model, a video generation model, and/or a multimodal media content item generation model) can process the context data to generate a predicted prompt 218. The generative model 216 can include a language model (e.g., a large language model, a vision language model, and/or other language models), a text-to-image generation model, and/or other generative models. The predicted prompt 218 can include text data, image data, audio data, latent encoding data, and/or multimodal data. The predicted prompt 218 can include a question that may be responded to by the user, a template for drafting a note, and/or one or more selectable note options.

For example, the predicted prompt 218 can include a question generated based on semantic analysis and/or topic determination for the web resource (e.g., for an article on a cold case, the prompt may include "what are your thoughts on the analysis of the cold case?", "who do you think committed the crime?", "was the article understandable and comprehensive with regards to the forensic evidence?", etc.). In some implementations, the predicted prompt 218 can include a template generated based on previously generated notes by the particular user and/or other users (e.g., if a user usually beings their notes with a preposition, the prompt may include a template beginning with a preposition that emulates a style and tone of previous notes). Additionally and/or alternatively, the predicted prompt 218 can include selectable note options based on previous comments provided for similar web resources (e.g., "the analysis of the case was thorough, understandable, and had a plausible conclusion," "forensic analysis lacked basis in verified science," "the article is more of a fan fiction that an actual article," etc.). In some implementations, the predicted prompt 218 can be descriptive of a request for a particular type of information about the web resource (e.g., for a biography on the politician, "what were your thoughts on their upbringing?", "please provide your insight on the epilogue," "in my experience as a congressional historian, this biography is accurate/untrustworthy/well-written/poorly-structured," etc.). Alternatively and/or additionally, the predicted prompt 218 can be descriptive of general information on the web resource. The predicted prompt 218 can include a novel text string not previously provided by the user and/or in relation with the web resource. The predicted prompt 218 can include a plurality of predicted characters, words, pixels, signals, and/or structure.

In some implementations, particular terms, detail, and/or structure of a search query may be utilized to determine a level of experience and/or knowledge of the user with regards to a particular topic. The search query may be included in the context data, and the generative model 216 may generate a predicted prompt 218 that reflects the level of determined experience and/or knowledge. Additionally and/or alternatively, previous search queries can be leveraged to determine a chain-of-search queries to determine a search intent. The search intent can then be leveraged to generate a predicted prompt 218 associated with the search intent.

In some implementations, the predicted prompt 218 may differ based on a user's propensity to provide a link note, based on user's previous notes, based on user's credibility, and/or other user data. If a user has never provided a link note before and/or only provided a few link notes previously, the predicted prompt 218 may be configured to be a general prompt, a multiple choice prompt, and/or conversational in format. The predicted prompt 218 for experienced users may be generated to provide a user with a direct prompt, note templates, and/or options based on previous interactions.

The predicted prompt 218 can be provided for display in an input entry interface. A user can interact with input entry interface to generate user-generated content 220 that can be transmitted to a server computing system (e.g., a search engine computing system). The user-generated content 220 can include text data, image data, audio data, video data, latent encoding data, and/or multimodal data. The user-generated content 220 can be descriptive of a note on the web resource. The note can be descriptive of commentary, an opinion (e.g., "I think the trade discussed in the article was fair based on the long-term outcomes for both teams), a review (e.g., "the short story lacked proper pacing and direction with the main character having zero character growth"), a verification (e.g., "the facts in this article match those of other reputable sources"), and/or an indication of quality and/or topic (e.g., "such a well-written play on the perils of love in war stricken towns"). The user-generated content 220 can include the note displayed in a graphical card with one or more graphics, one or more widgets, one or more links, one or more media content items, and/or a graphical background. For example, the text of the link note may be provided in stylized text with a color that juxtaposes the model-generated image that is used as background.

In some implementations, the generative model 216 may process the user-generated content 220 and may generate a follow-up prompt. The follow-up prompt may request additional information and/or may provide options for further customization.

The user prompting system 200 can store the note 222 with the web resource. The indexing can be leveraged to provide the user-generated content 220 including the link note for display when providing a search result for the web resource. Alternatively and/or additionally, the user-generated content 220 can be stored in a note database to be displayed in a notes interface when selected by one or more users.

For example, the particular user and/or other users may input a search query. The search engine system may determine the web resource is responsive to the search query. A search result associated with the web resource can be provided in a search results interface with the title of the web resource, a media snippet, and data descriptive of the link note (e.g., the graphical card).

Figure 3:
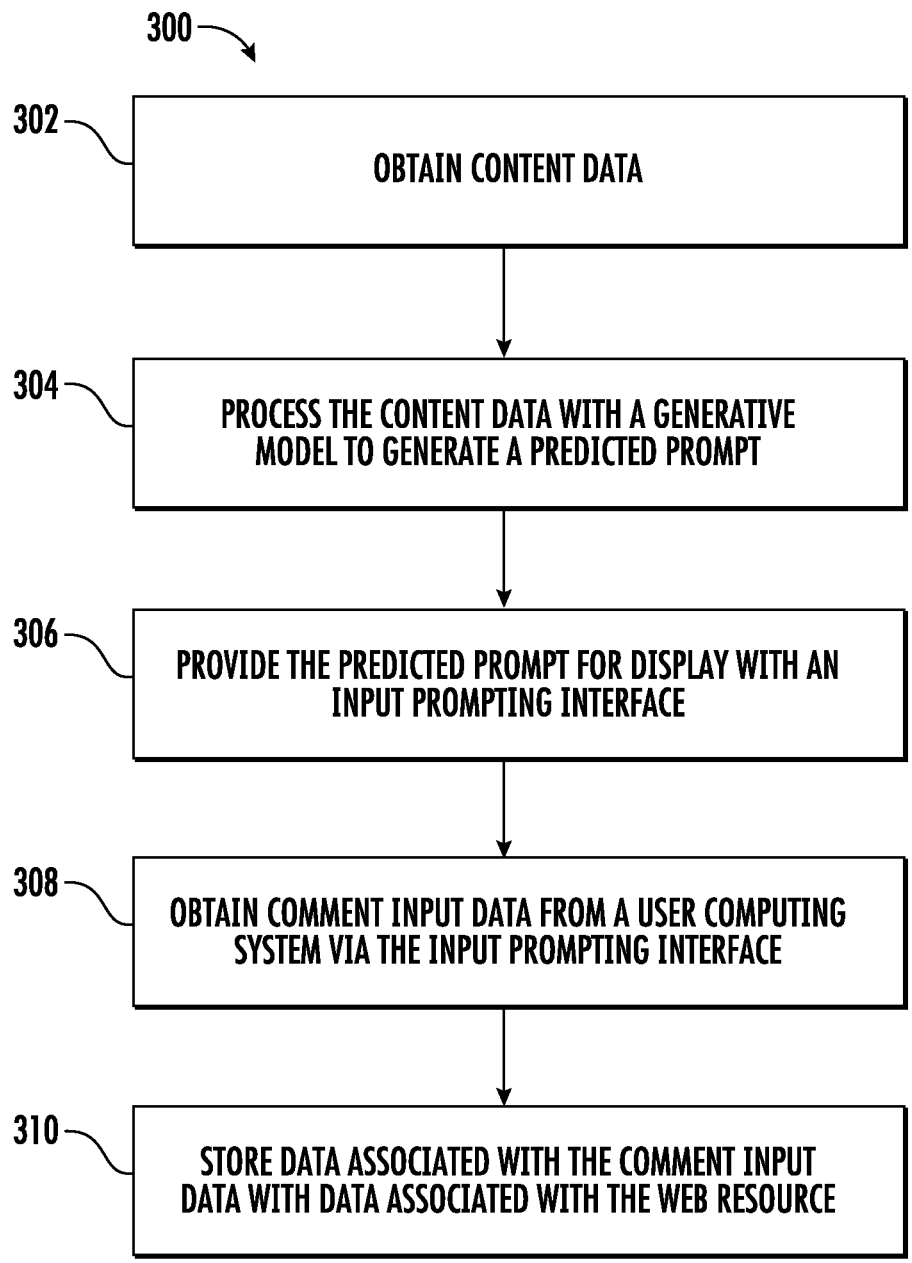
FIG. 3 depicts a flow chart diagram of an example method to perform link note prompting according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain content data. The content data can be associated with a web resource. The content data can be descriptive of the content of the web resource, which can include text data, image data, video data, audio data, latent encoding data, and/or multimodal data. The content data can include data descriptive of a topic of the web resource, a type of content, other notes received from other users, web resource metadata, author of web resource, and/or an entity associated with the web resource. The content data can include content labels, the entirety of the web resource content, a summary of the content, media snippets, and/or a content embedding.

At 304, the computing system can process the content data with a generative model to generate a predicted prompt. The prompt can include a predicted text string associated with commenting on the web resource. The generative model can include an autoregressive language model. In some implementations, the generative model can be prompted to generate a question descriptive of a request for information on the web resource. The generative model can include a transformer model. The generative model may have been trained, configured, and/or prompted to perform semantic understanding on web resources and then generate a prompt (e.g., a question) based on the semantic understanding. The predicted prompt can include a plurality of predicted characters that may be specifically determined based on the content data. The predicted prompt may ask about the quality of the web resource. The predicted prompt may ask about an opinion and/or review of the web resource.

In some implementations, the computing system can obtain user data. The user data can be associated with a particular user. Processing the content data with the generative model to generate the predicted prompt can include processing the content data and the user data with the generative model. The user data can include user search history data, user browsing history data, a user's social network, user preferences, user profile information, a user's location, user purchase history, and/or user connections. The generative model can generate the predicted prompt based on the particular user previously searching for information associated with a topic of the web resource. Alternatively and/or additionally, the generative model can generate the predicted prompt based on the particular user previously viewing other web resources comprising information associated with a topic of the web resource. The generative model can determine the particular user is associated with a particular topic, a particular type of content, a particular opinion, and/or a particular context for commenting, and can generate the predicted prompt based on the determination.

At 306, the computing system can provide the predicted prompt for display with an input prompting interface. The input prompting interface can be configured to receive inputs. The input prompting interface can include a plurality of selectable user interface elements. In some implementations, the input prompting interface can include an input entry box for receiving inputs from a user. The input prompting interface can include an upload element for uploading media content items (e.g., documents, images, text, videos, audio files, etc.). In some implementations, the input prompting interface can include an interface for the user to provide an input to the generative model to generate a model-generated note based on the user input. Alternatively and/or additionally, the plurality of selectable user interface elements may include one or more selectable templates for generating user-generated content (e.g., a user-generated note). The one or more templates may be generated based on previously generated content items (e.g., previously generated notes) by the particular user.

At 308, the computing system can obtain comment input data from a user computing system via the input prompting interface. The comment input data can include text data, image data, audio data, latent encoding data, and/or multimodal data. The comment input data can include one or more selections, one or more text strings, and/or one or more uploaded files. The comment input data can include a user-generated comment on the web resource. The user-generated comment can include a comment on the quality of the web resource, the topic of the web resource, and/or other aspects of the web resource.

At 310, the computing system can store data associated with the comment input data with data associated with the web resource. Storing the data associated with the comment input data with the data associated with the web resource can include generating a web resource note and storing the web resource note with a plurality of other web resource notes associated with the web resource. The comment input data can be indexed in association with the web resource and may be stored in a database to be provided with a search result for the web resource. The data associated with the comment input data may be stored in a searchable database to be provided for display in response to the web resource being determined and/or provided as a search result.

In some implementations, the computing system can provide the web resource note and the plurality of other web resource notes in a notes interface that provides the web resource note and the plurality of other web resource notes in a plurality of graphical cards.

Additionally and/or alternatively, the computing system can generate a graphical card based on the user data, the content data, and the comment input data. The graphical card can include a user profile identifier for the particular user and data associated with the comment input data. The computing system can then store the graphical card. The graphical card can include a graphical background generated with an image generation model based on the comment input data.

In some implementations, the computing system can obtain a search query, determine the web resource is associated with the search query, and provide a particular search result for display. The particular search results can include a link to the web resource, a title of the web resource, and data associated with the comment input data.

FIG. 4 depicts illustrations of example prompts according to example embodiments of the present disclosure. In particular, an example input entry interface 402 is depicted in FIG. 4. The example input entry interface 402 can be provided in response to determining an input request action is to be performed and a predicted prompt is generated. The input entry interface 402 can include a link and/or reference to the web resource 404, a compose panel 406 for displaying inputs provided during user-generated content generation, one or more selectable predicted prompts 408, and/or one or more user interface elements for providing audio inputs and/or multimedia inputs (e.g., images).

The one or more selectable predicted prompts 408 can include predicted prompts generated by processing the content of the web resource 404 with a generative language model. Alternatively and/or additionally, the one or more selectable predicted prompts 408 can include predicted prompts generated by processing notes associated with similar articles to the article provided by the web resource 404 with a generative language model.

The suggested predicted prompts can be provided in a plurality of formats. Additionally and/or alternatively, the number and/or length of the predicted prompts may vary based on the content, the user, and/or other context data. For example, three options may be provided 412 or ten options 414 may be provided. The note options can include a plurality of selectable prompts that can be selected by a user as their link note and/or as part of their link note.

The input entry interface 402 can be utilized to receive text inputs (e.g., via a graphical keyboard interface), audio inputs (e.g., via one or more microphones), selections (e.g., selections of user interface elements associated with predicted prompt note options), and/or media content item inputs (e.g., an image upload). The received inputs can be provided for display in a preview window of the compose panel 406 and can then be utilized to generate a user-generated content item, which may include a link note.

Figure 5A:
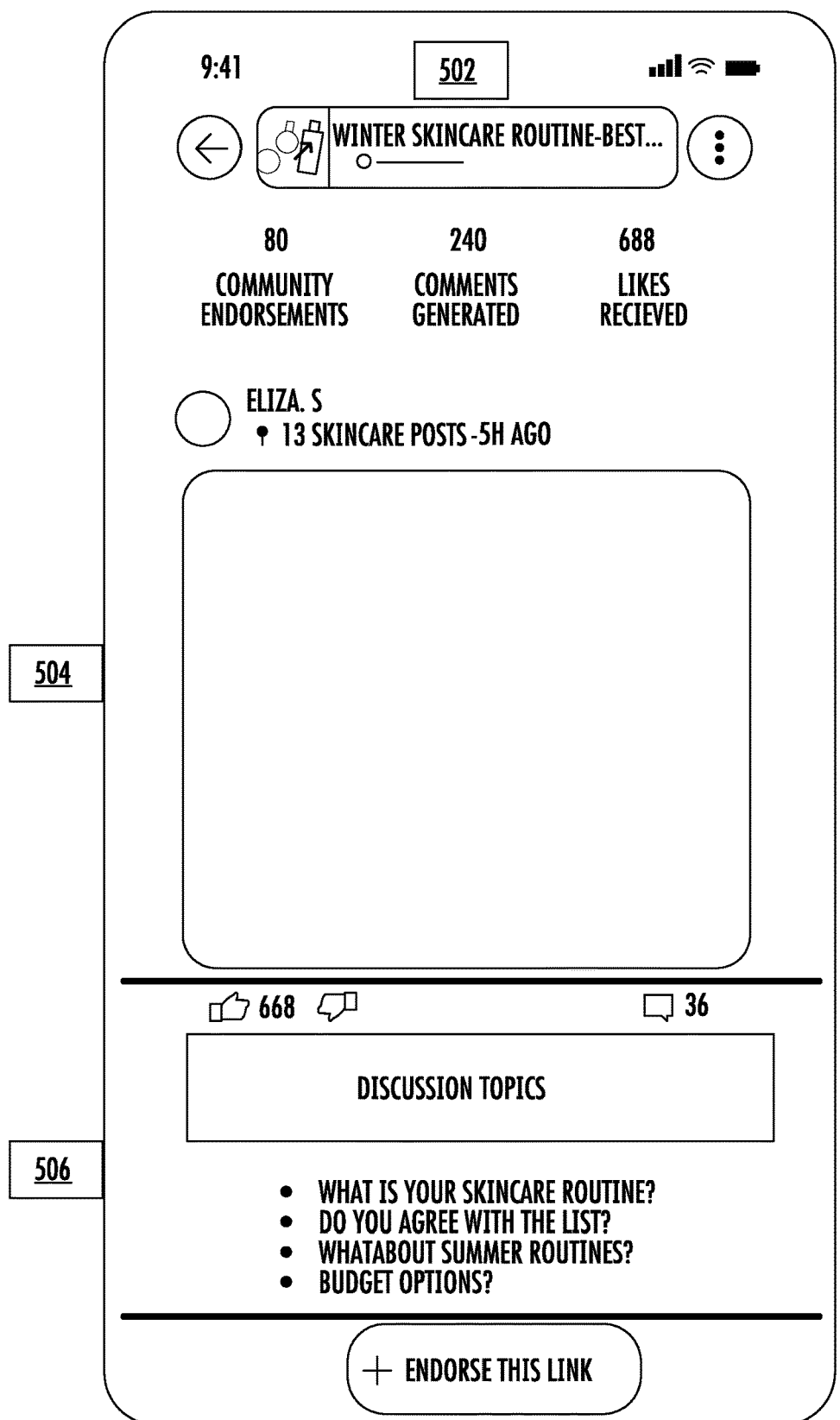
FIG. 5A depicts an illustration of an example notes interface with topic prompting according to example embodiments of the present disclosure.

FIG. 5A depicts an illustration of an example notes interface with topic prompting according to example embodiments of the present disclosure. The example notes interface can be utilized to learn more about the web resource 502, read other user's thoughts on the web resource 502, and/or generate and provide new notes on the web resource 502. In particular, FIG. 5A depicts a link to the web resource 502, a previously provided note 504, one or more prompts 506 for requesting information from the user, and an endorsement user interface element 508. The link to the web resource 502 can include a thumbnail, a URL, and a title. The previously provided note 504 can include an image and/or text provided by another user. The previously provided note 504 may be provided with interaction data including endorsements, comments, and/or likes. The one or more prompts 506 for requesting information from the user can include discussion topics for the user to respond to in their note. The endorsement user interface element 508 can be utilized to interact with the web resource 502 and/or the previously provided note 504.

Figure 5B:
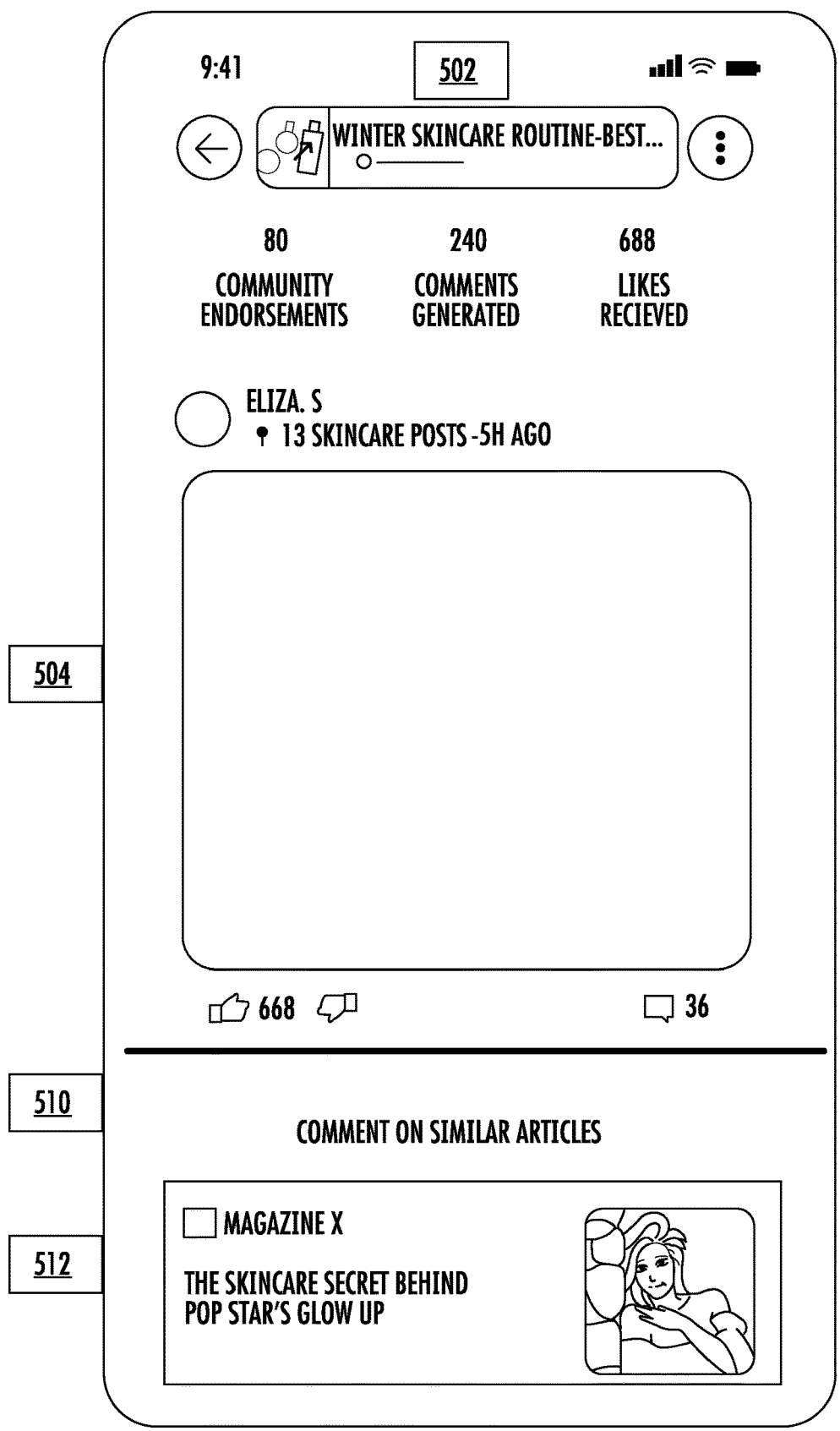
FIG. 5B depicts an illustration of an example notes interface with similar article prompting according to example embodiments of the present disclosure.

FIG. 5B depicts an illustration of an example notes interface with similar article prompting according to example embodiments of the present disclosure. The example notes interface can be utilized to learn more about the web resource 502, read other user's thoughts on the web resource 502 (e.g., an opinion on the topics of the web resource and/or the quality of the web resource), and/or generate and provide new notes on the web resource 502 (e.g., a user can provide their own details and/or thoughts on the web resource). In particular, FIG. 5B depicts a link to the web resource 502, a previously provided note 504, a user interface element 510 to comment on similar articles to the web resource 502, and a suggested article 512. The link to the web resource 502 can include a thumbnail, a URL, and a title. The previously provided note 504 can include an image and/or text provided by another user. The previously provided note 504 may be provided with interaction data including endorsements, comments, and/or likes. The user interface element 510 to comment on similar articles to the web resource 502 can be selectable to open an input entry interface for providing link notes on one or more similar web resources, which may include the suggested article 512.

FIG. 5C depicts an illustration of example predicted prompts according to example embodiments of the present disclosure. In particular, content data associated with a web resource and/or user data associated with a particular user being prompted to can be processed with a generative model to generate one or more predicted prompts. FIG. 5C depicts example question prompts 514 and starting point prompts 516. The question prompts 514 can include questions for asking the user to provide information on a particular topic and/or sub-topic. The starting point prompts 516 can include an introduction sentence for a user to build off of with their link note. The user-generated content that includes the link note may include the starting off prompt when being provided in a search results interface and/or a notes interface.

Figure 6A:
Figure 6C:
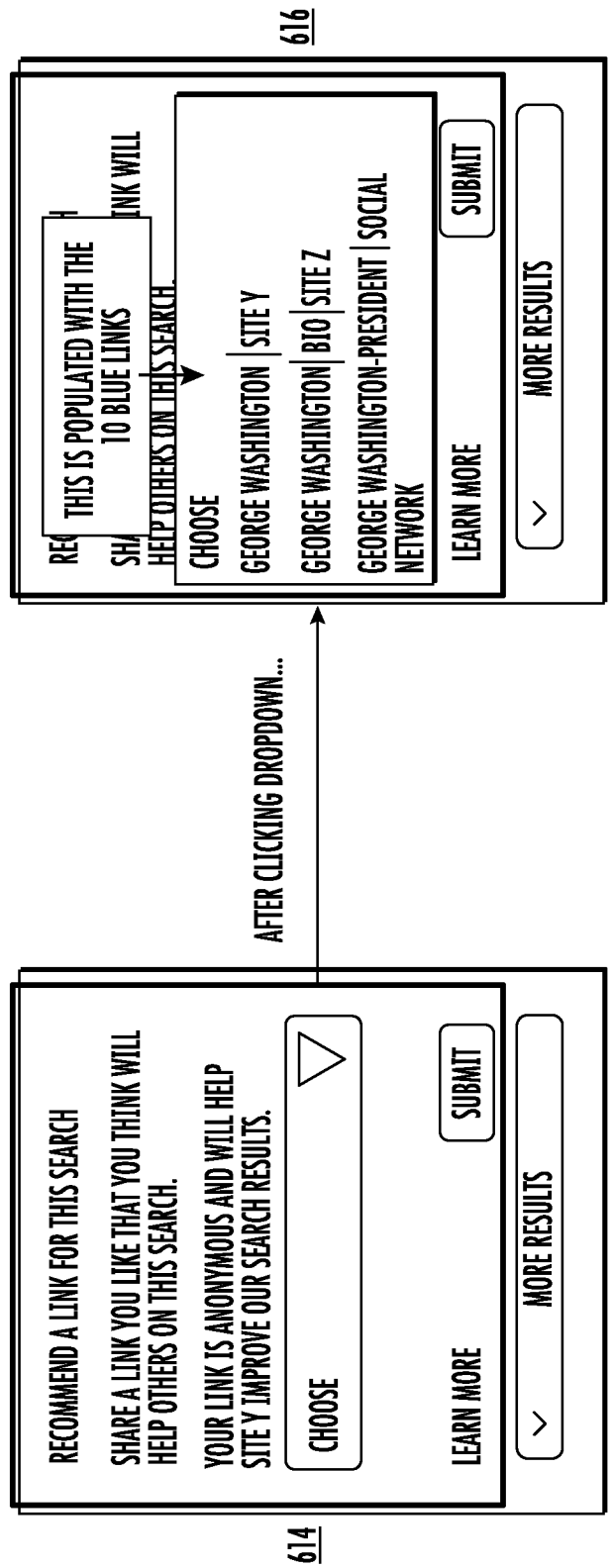

FIGS. 6A-6C depict illustrations of example link note entry points according to example embodiments of the present disclosure. Entry points to a link note generation interface can be provided in a plurality of different interfaces and/or mediums. In particular, FIG. 6A depicts example search result interfaces with example search results 602. Context data associated with the search instance (e.g., user data, the search query, and/or the search results) may be processed to determine a link note prompt is to be provided. FIG. 6A depicts a first example prompt 604 provided in response to determining the user has previously searched for this topic. Additionally, FIG. 6A depicts a second example prompt 606 provided in response to determining an interaction trend and/or determining the particular web resource is a content type that is often interacted with for note generation.

FIG. 6B depicts three different entry points for link note prompting and generation. The first entry point 608 can include a dropped down menu of a browser application. The user may select an options dropdown and select the note generation option from the dropdown. The second entry point 610 can be included within a search results interface. The user may select the option within the search results interface to comment on previously viewed content. The third entry point 612 can include an overlay user interface element that can be provided in the viewing window for the content of the web resource. The overlay user interface element can be provided by the web resource, the browser, and/or an operating system of a user computing device.

FIG. 6C depicts a search review entry point. In particular, a widget and/or a graphical pane can be provided to a user to provide a review a previous search experience, which can include selecting a dropdown list element 614 to select a web resource from a viewed content list 616 to indicate which web resource was helpful for their particular search. The selection may be utilized to generate a link note, re-rank web resources, and/or to navigate to a link note generation interface.

Figure 7:
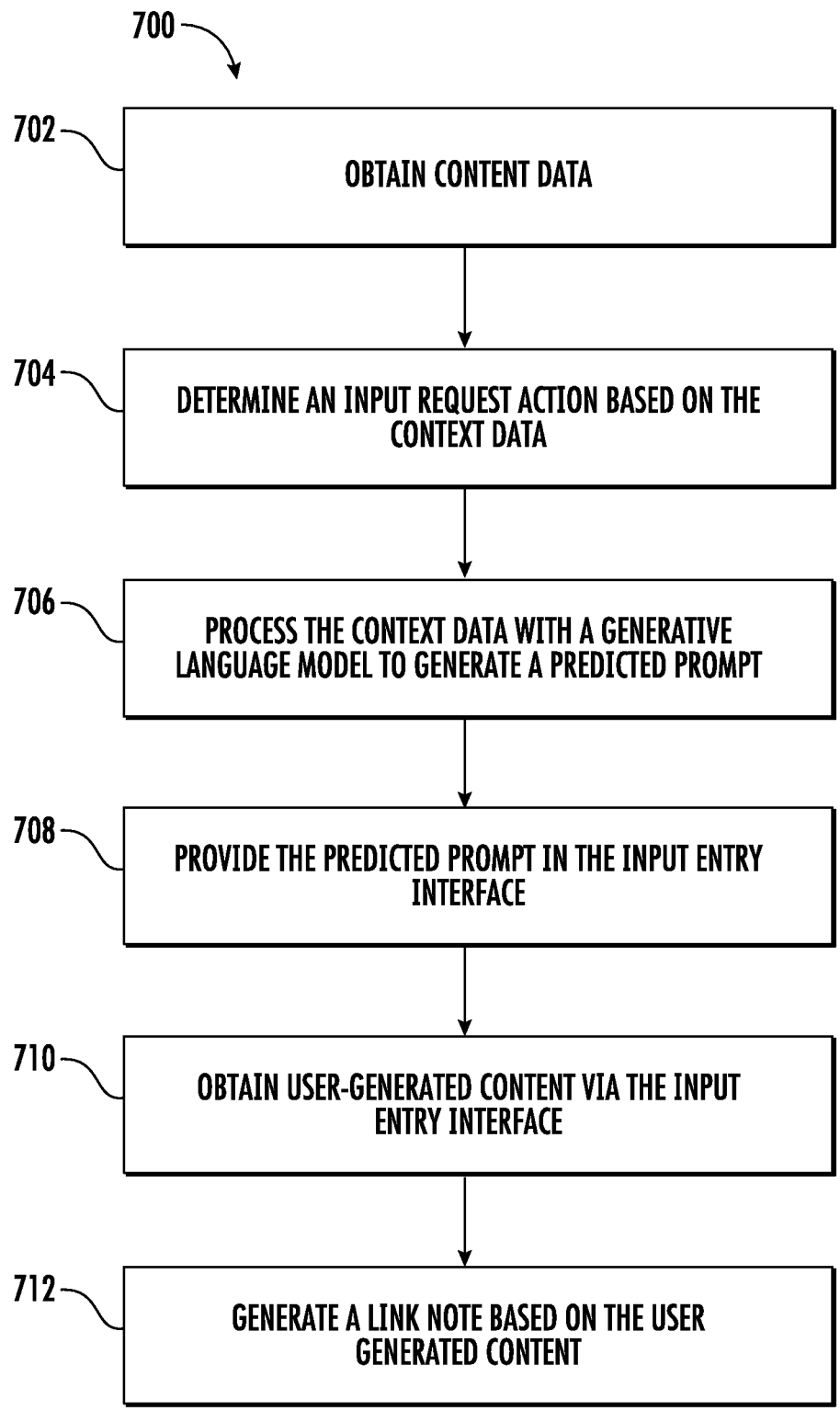
FIG. 7 depicts a flow chart diagram of an example method to perform link note generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain context data. The context data can be associated with a particular content display instance. The particular content display instance can include a particular user viewing a particular content item. In some implementations, the context data can be associated with a type of content (e.g., an article, a scholastic paper, a blog post, an encyclopedia entry, a video, a media content library, and/or other types of content) being provided for display. Additionally and/or alternatively, the context data can be associated with the particular user associated with the particular content display instance. The context data can include search history data, browsing history data, user profile data, purchase history data, social network data, and/or other user data.

At 704, the computing system can determine an input request action based on the context data. The input request action can include providing an input entry interface to a user to obtain a user input. Content being provided for display can be associated with a particular web resource. The context data can be associated with interaction data for a link of the particular web resource on a plurality of social network platforms (e.g., posts, comments, reposts, likes, and/or mentions of the link). In some implementations, the input request action can be determined based on the interaction data. The context data can include user data and content data. Additionally and/or alternatively, the input request action can be determined based on a topic associated with content being provided for display being one of a plurality of topics the particular user is determined to have knowledge of based on the user data.

At 706, the computing system can process the context data with a generative language model to generate a predicted prompt. The predicted prompt can include a natural language request for information generated based on the context data. The context data can include previous notes generated by the particular user. The predicted prompt can include a structure based on previous structures for the previous notes. In some implementations, the generative model may process the content data to generate a predicted prompt based on the content of the particular web resource.

At 708, the computing system can provide the predicted prompt in the input entry interface. The predicted prompt may be provided adjacent to an input entry box for receiving and displaying input text and/or images. The input entry interface can include a panel adjacent to a search result for the particular web resource. Alternatively and/or additionally, the input entry interface can be provided in a pop-up interface and/or may be redirected to based on one or more inputs.

At 710, the computing system can obtain user-generated content via the input entry interface. The user-generated content can include text data, image data, video data, audio data, latent encoding data, statistical data, and/or multimodal data. The user-generated content can be obtained via an upload interface and/or via the input entry box.

At 712, the computing system can generate a link note based on the user-generated content. In some implementations, the computing system can generate a graphical card that includes the link note. The graphical card can include a graphical background that may be selected by the user and/or may be automatically generated. The graphical background may be generated based on the content of the web resource, content of the link note, and/or a type of note. The graphical card and/or the link note can be stored to be provided with data associated with the web resource. The link note can be generated to be provided for display in a search results interface in response to the particular content item being determined as a search result.

Figure 8:
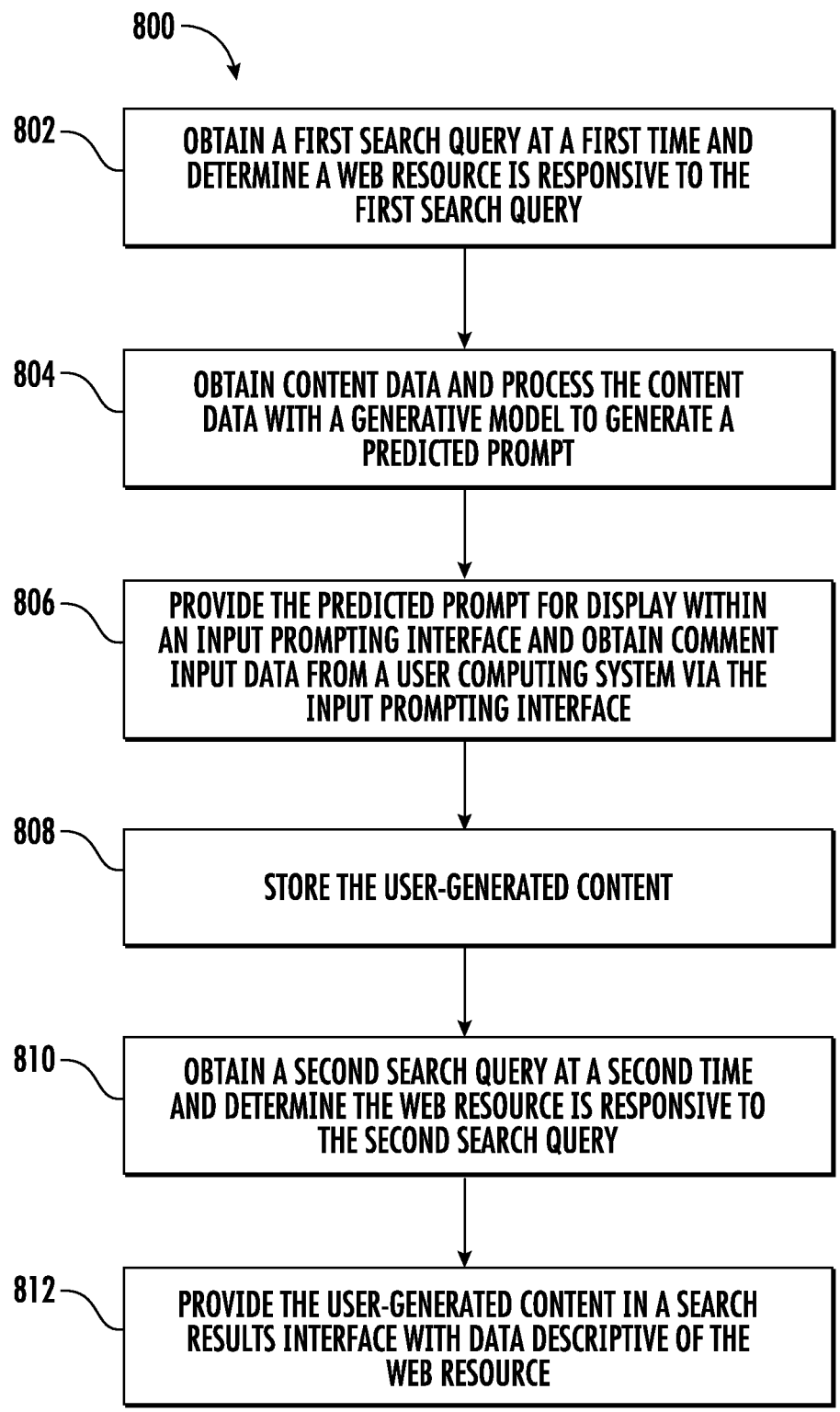
FIG. 8 depicts a flow chart diagram of an example method to perform link note display according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a first search query at a first time and determine a web resource is responsive to the first search query. The first search query can include a text query, an image query, an audio query, an embedding query, and/or a multimodal query. The web resource may be identified via a search engine, which may perform key word search, an embedding based search, and/or other search techniques. The web resource may be determined to be responsive to a topic, question, and/or intent of the first search query.

At 804, the computing system can obtain content data and process the content data with a generative model to generate a predicted prompt. The content data can be associated with the web resource. The prompt can include a predicted text string associated with commenting on the web resource. The content data can be descriptive of an entirety of the contents of the web resource, media snippets, a summary of the content, content labels, metadata, and/or contents of previously provided link notes associated with the web resource. The generative model can process the content data to determine a topic, a perspective, an intent, a theme, a structure, an intended audience, a content type, and/or other content details. The predicted prompt can then be generated based on the determination.

At 806, the computing system can provide the predicted prompt for display within an input prompting interface and obtain comment input data from a user computing system via the input prompting interface. The input prompting interface can include an input entry box. In some implementations, the input prompting interface may include a plurality of user interface elements for drafting content (e.g., notes). The comment input data can include user-generated content. In some implementations, the comment input data can include multimodal data. The multimodal data can include text data and image data.

At 808, the computing system can store the user-generated content. The user-generated content can be indexed with a link to the web resource. Alternatively and/or additionally, the web resource may be indexed with the user-generated content. The user-generated content may be stored with other user notes associated with the particular web resource and/or the particular user.

At 810, the computing system can obtain a second search query at a second time and determine the web resource is responsive to the second search query. The second time can differ from the first time. In some implementations, the first search query and the second search query can differ. The second search query can include a text query, an image query, an audio query, an embedding query, and/or a multimodal query. The web resource may be identified via a search engine, which may perform key word search, an embedding based search, and/or other search techniques. The web resource may be determined to be responsive to a topic, question, and/or intent of the second search query.

At 812, the computing system can provide the user-generated content in a search results interface with data descriptive of the web resource. The user-generated content may be provided with a link, a title, and a text snippet for the web resource.

FIGS. 9A-9G depict illustrations of example graphical card interfaces according to example embodiments of the present disclosure. The systems and methods disclosed herein can be leveraged to generate graphical cards for user-generated content, which can include link notes and/or stand alone content.

FIG. 9A depicts two example graphical cards. The depicted graphical cards can include a user profile identifier 902 (e.g., a user profile image and name), the body of the card 904 (e.g., a link note in stylized text superimposed over a graphical background), widget interface elements 906 (e.g., a selectable user interface element for redirecting to a web resource and/or additional content), and/or interaction information 908 (e.g., likes, comments, and/or saves for the graphical card). The body of the card 904 can be configured by a particular user and/or may be automatically generated based on the link note, a web resource, and/or user preferences. The widget interface elements 906 can include links to web pages, links to an image gallery, links to videos, selectable elements for opening a pop-up interface, additional notes, and/or other data.

FIG. 9B depicts an example multipage user-generated content and an example video user-generated content. The multipage user-generated content can include a plurality of graphical cards that can be cycled through to display the user-generated content. The video user-generated content can include a video with graphics and/or text overlayed over the video.

Widget interface elements 906 can include a link to the web resource, a link to one or more other web resources, a video element selectable to provide a video for display, a media content display element for providing media content for display (e.g., videos, images, audio files, and/or other media), a review for the web resource, a link to other notes, a structure content item (e.g., structured recipe and/or structured calculator), a list (e.g., an ingredients list), a maps place card (e.g., a map associated with the web resource and/or a link to a web application), a knowledge panel, and/or a link to a shopping interface.

Figure 9C:
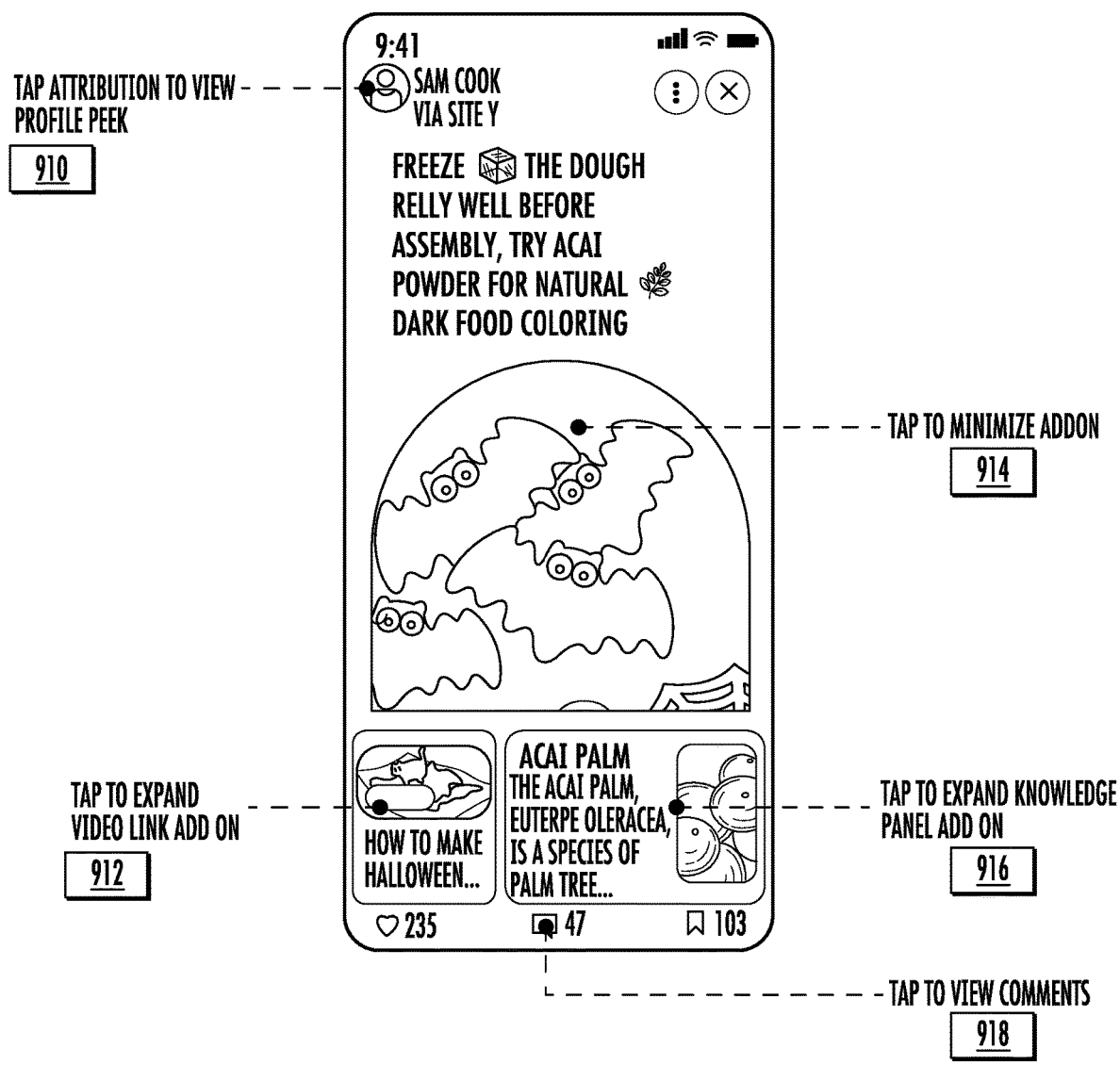

FIG. 9C depicts example interactions with a graphical card. For example, the user profile identifier 902 can be selected to peek at a user's profile 910. Additionally and/or alternatively, a video widget element 912 may be selected to expand the video for playback and/or to navigate to a video player interface. The graphical card may be selected to minimize the addon 914. A knowledge panel widget element 916 may be selected to expand a knowledge panel to provide additional information for display. The interaction elements 918 can be selected to like, comment on, save, and/or share the user-generated content.

Figure 9D:
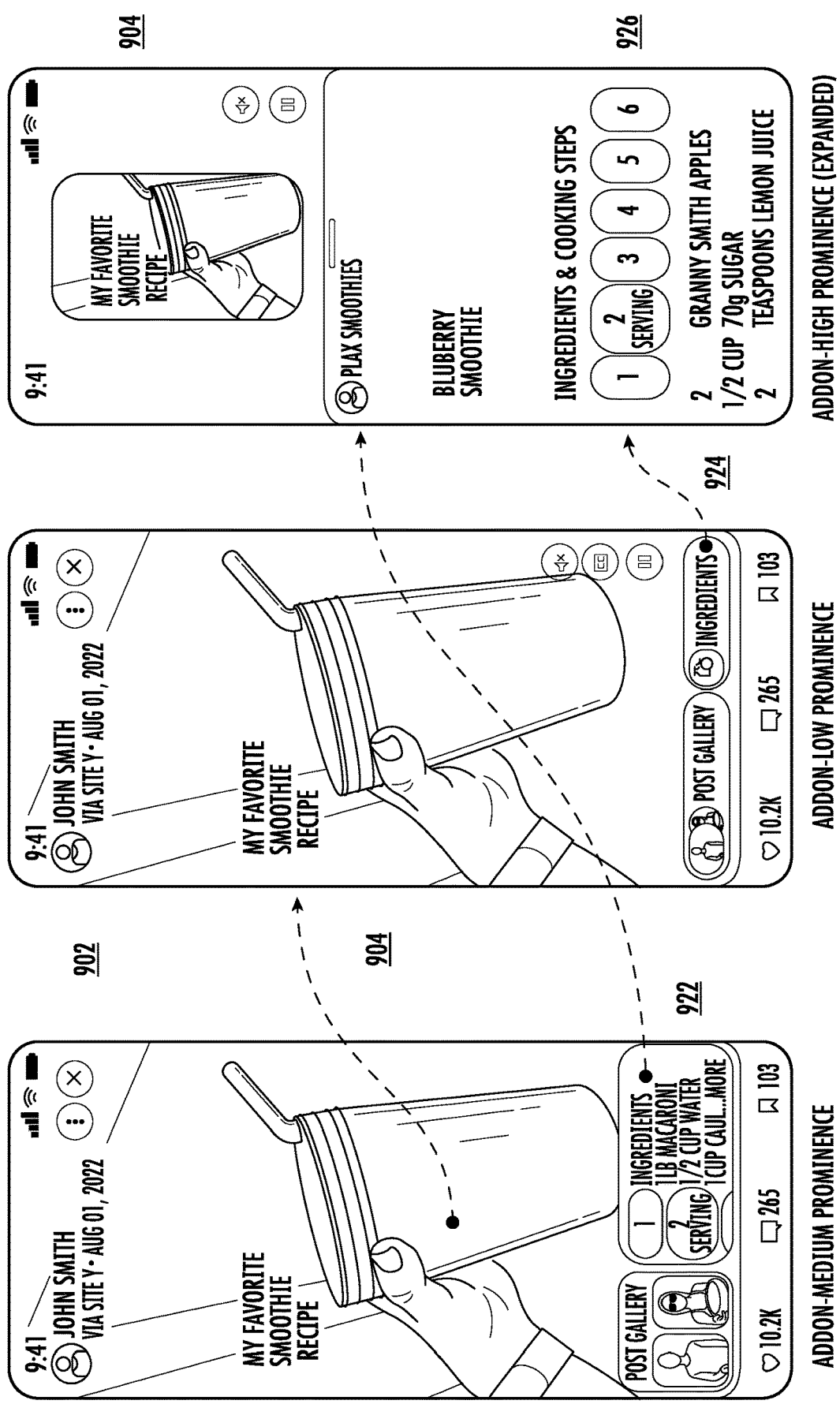

FIG. 9D depicts prominence levels for widget interface elements (e.g., add-on elements). In particular, the ingredients and instructions for a depicted smoothie may be provided in a medium prominence interface element 922 (e.g., detail view state), a low prominence interface element 924 (e.g., a collapsed state), and/or a high prominence graphical panel 926 (e.g., an expanded state). In some implementations, a user may interact with the widget interface element to transition between the levels of detail and/or size.

Figure 9E:
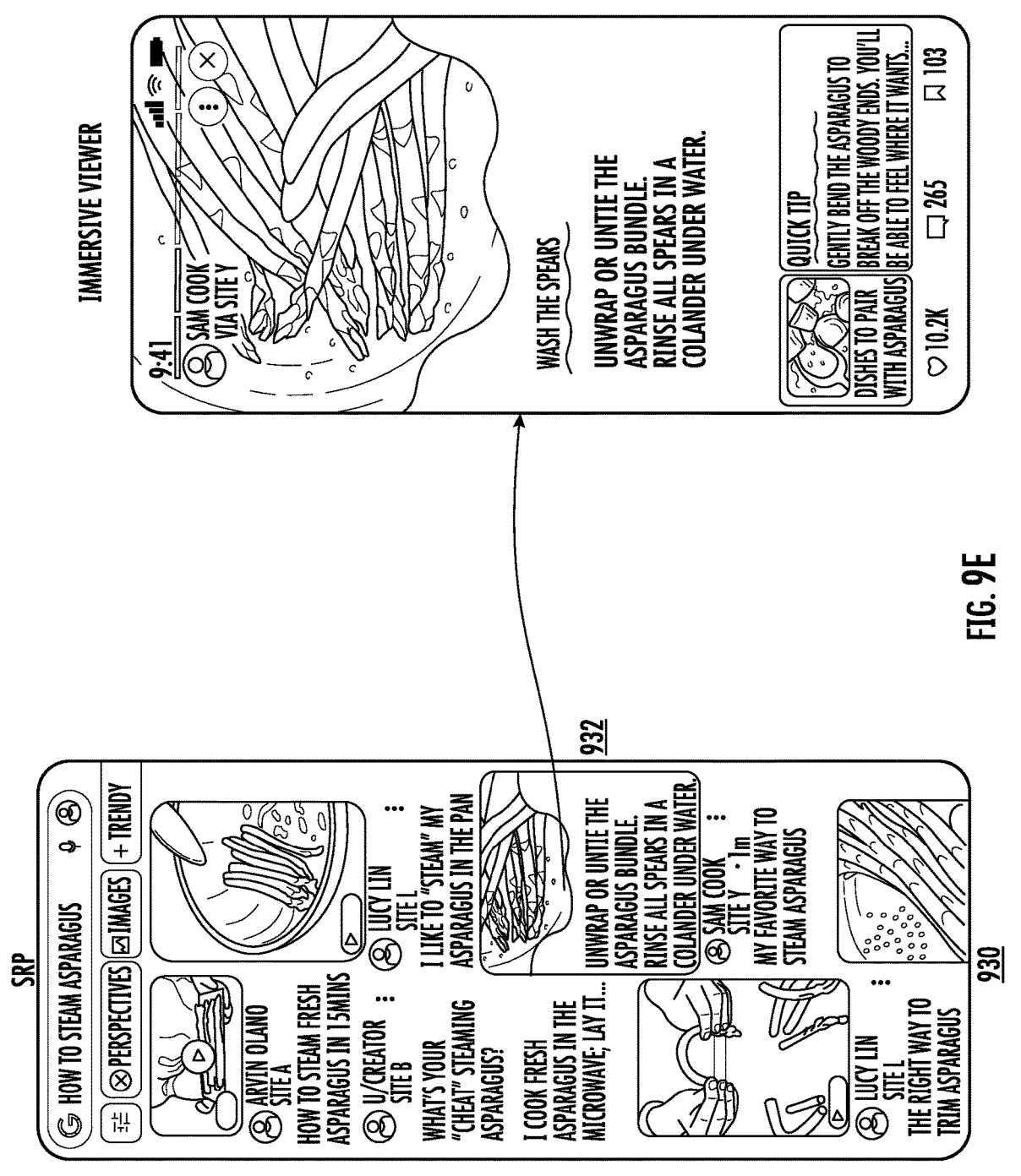

FIG. 9E depicts notes search results in a search results interface 930. The notes search results can be provided in a separate tab, adjacent to other search results, and/or in a category-specific panel. A note search result 932 may be selectable to navigate to an immersive viewer 936 that displays an expanded view of the user-generated content.

Figure 9F:
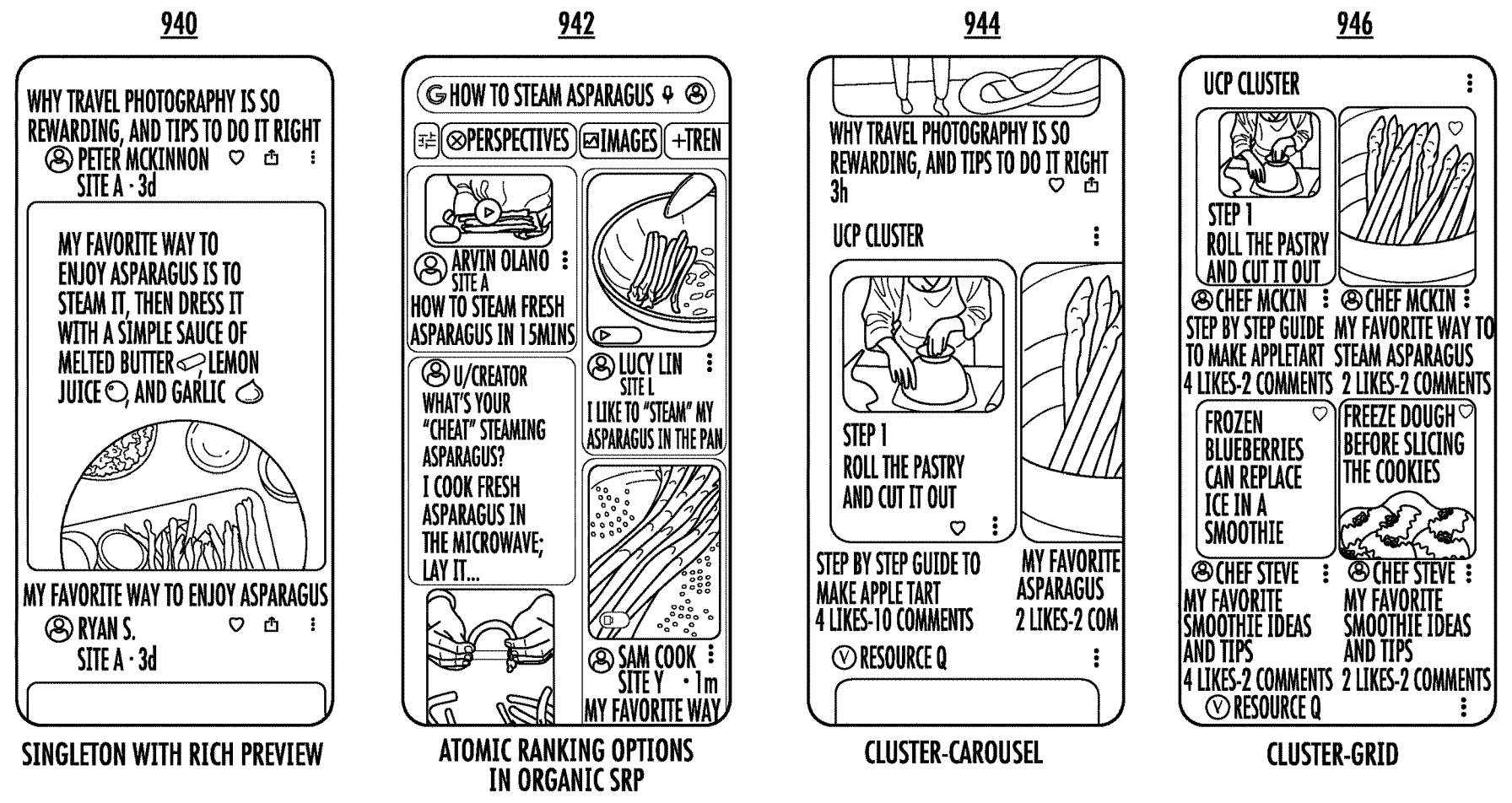

FIG. 9F depicts different graphical card displays and/or note interface displays. The graphical cards may be displayed in a vertically-scrollable single width format 940, an offset vertically-scrollable two-wide format 942, a horizontally-scrollable carousel interface 944 within other search result formats, and/or an aligned vertically-scrollable two-wide format 946. The format may be based on the topic, the type of interface, user preferences, and/or a context.

FIG. 9G can depict different customization options. For example, a graphical card customization interface may be provided to generate the graphical card, which may include editing text 952, editing a layout 954, editing an image 956, and/or other customization options. In particular, the interactive interface can include a plurality of options (and/or features) for content generation. The plurality of interface features can include text, image, audio, video, template, and/or other input options. The plurality of interface features can include content suggestions, template suggestions, and/or one or more generative model interfaces for generative model aided generation (e.g., a large language model for rewriting text and/or proactively generating text; an image generation model for generating novel images based on the web resource, a user input, and/or the generated prompt; an audio generation model for generating a narration, a song, and/or other audio; and/or a graphical card generation model for processing the web resource, the generated prompt, and/or user inputs to generate a graphical card that can be suggested to the user for the link note and/or for stand alone content). The plurality of interface features can include customization options for customizing the layout, font(s), interface element size(s), image(s), text, transition(s), tone, shading, and/or other user-generated content features. The plurality of interface features can include options to add action user interface elements to a graphical card of user-generated content. The action user interface elements can include selectable options for performing one or more actions (e.g., an API call, a navigation to a different application, a search, a content item generation with a generative model, etc.).

The systems and methods disclosed herein can include image suggestion and/or image generation for generating the graphical cards. For example, the systems and methods may determine images from a database (e.g., a server database, a local database, and/or a user image gallery) is associated with the web resource, the prompt, and/or the link note. The images may then be provided as suggestions to be utilized in the graphical card. Alternatively and/or additionally, the systems and methods may provide an image generation model (e.g., a text-to-image generative model) interface to generate an image to include in the graphical card. For example, an image generation model interface can be provided to a user, the user may provide a prompt to the image generation model, and the image generation model can generate a model-generated image that can then be utilized in the graphical card.

In some implementations, one or more machine-learned models may be utilized to fact check web resources and/or the link notes. The one or more machine-learned models may include one or more generative models that can leverage application programming interfaces for API calls to obtain information and/or interact with other applications.

In some implementations, a generative model may be utilized to generate one or more model-generated link notes that can be indexed with the web resource to provide link note examples and/or provide a semantic understanding note. Alternatively and/or additionally, a generative model can be utilized to rewrite and/or suggest link notes and/or sand alone content. The interactive user interface can include an interface for interacting with a generative model to generate content (e.g., text, image(s), and/or other data). The interactive user interface can include options for selecting a tone, a style, a format, a lexicon, a genre, and/or other attributes for conditioning the generative model to generate content with a particular attribute. For example, the interactive user interface can be configured to generate a prompt for the generative model based on user inputs, the link note prompt, and/or the web resource.

The search results interface and/or a discover interface may provide statistics on the volume of particular searches, the volume of web resource selections, and/or trends in link and/or search query interactions.

In some implementations, the systems and methods can include training and/or leveraging one or more contribution propensity models. The contribution propensity model can learn and/or determine user credibility for a particular user and/or a particular set of users (e.g., their relevant experience, expertise, and/or trustworthiness). Additionally and/or alternatively, the contribution propensity model can learn and/or determine a propensity to provide a link note.

The contribution propensity model may be trained to detect likelihood to contribute, credibility, utility of note, and/or other attributes associated with the user, the web resource, and/or the context. The contribution propensity model may be trained on labeled datasets, based on unlabeled datasets, and/or based on a hybrid dataset. In some implementations, the contribution propensity model may be trained on interaction data for learning contribution prediction tasks, may be trained on outputs from a verification model for a credibility determination tasks, and/or may be trained on click rates for utility determination tasks.

FIG. 10 depicts an illustration of example card generation interface 1000 according to example embodiments of the present disclosure. In particular, a user may select an option to generate a graphical card for a link note. Based on the selection, a template 1002 may be selected and provided for display. A particular template may be selected based on the web resource associated with the link note (e.g., based on the content of the web resource), based on a user interaction history, based on a query history, based on user profile data, and/or based on other data.

The card generation interface 1000 may include a pull-up menu 1004 associated with a plurality of suggested prompts for link note generation, which may include topic ideas. The user may pull-up the menu to provide an expanded view 1006 of suggested prompts. The expanded view 1006 can include a plurality of selectable suggested prompts that may be selected to generate text, images, and/or layouts to be inserted into the graphical card. For example, the "How to Water Your Monstera Like a Pro" suggestion can be selected. A content item associated with the selected prompt suggestion can be inserted into the graphical card, which may transition to an editing interface 1008. The editing interface 1008 can include options to edit the text, the style, the layout, the font, the color, and/or other edits.

FIG. 11 depicts an illustration of example content item generation interface 1100 according to example embodiments of the present disclosure. In particular, in modifying a graphical card template, an input drafting interface may be utilized for generating one or more content items.

For example, the user may select an option to open the content item generation interface 1100. At 1102, a user may select one or more attributes from a dropdown menu. The one or more attributes can be associated with requested for attributes for the content item being generated. The one or more attributes may be associated with a tone and/or a style for the content. At 1104, a user may generate and/or provide a text input. The text input can be associated with a topic, intent, information, and/or other prompt details. The one or more attributes and the text input can be processed with a generative model to generate a model-generated content item. The model-generated content item can have the one or more attributes and may be directed to the topic, intent, information, and/or other prompt details of the text input.

At 1106, the model-generated content item can be provided for display below the text input and may be provided with a plurality of options. The plurality of options can include editing the one or more attributes, editing the text input, reprocessing the data, saving the mode-generated content item, exiting out of the interface, inserting the model-generated content item into the graphical card, and/or other options. At 1108, the modified graphical card can be provided for display with the model-generated content item inserted into the graphical card based on a user selection. The user may then edit the layout, size, colors, fonts, and/or orientations of the model-generated content item and/or other content of the graphical card.

FIG. 12 depicts an illustration of example image suggestion interface 1200 according to example embodiments of the present disclosure. In particular, the image suggestion interface 1200 can obtain card data, context data, and/or input data. The card data, context data, and/or input data can then be processed to determine one or more images (and/or other media content items) to provide as suggestions for insertion in a graphical card.

For example, at 1202, a graphical card is provided for display with an option to insert additional text, a sticker, and/or an image. The user may then select the add image option. At 1204, an image selection interface can be provided for display, which can include default images, camera roll images, and/or image suggestions based on the text of the graphical card, the contents of the web resource associated with the link note, a user history, and/or other data. For example, a plurality of images from the user's image gallery may be determined to be relevant to the text of the graphical card based on determining the images are associated with a location (e.g., Mexico) that was referenced in the text of the graphical card. At 1206, the identified images can be provided for display for selection. A user may select a particular image from the identified images, which may be processed and inserted into the graphical card. At 1208, the selected image may be cropped and inserted into the graphical card for display.

Figure 13:
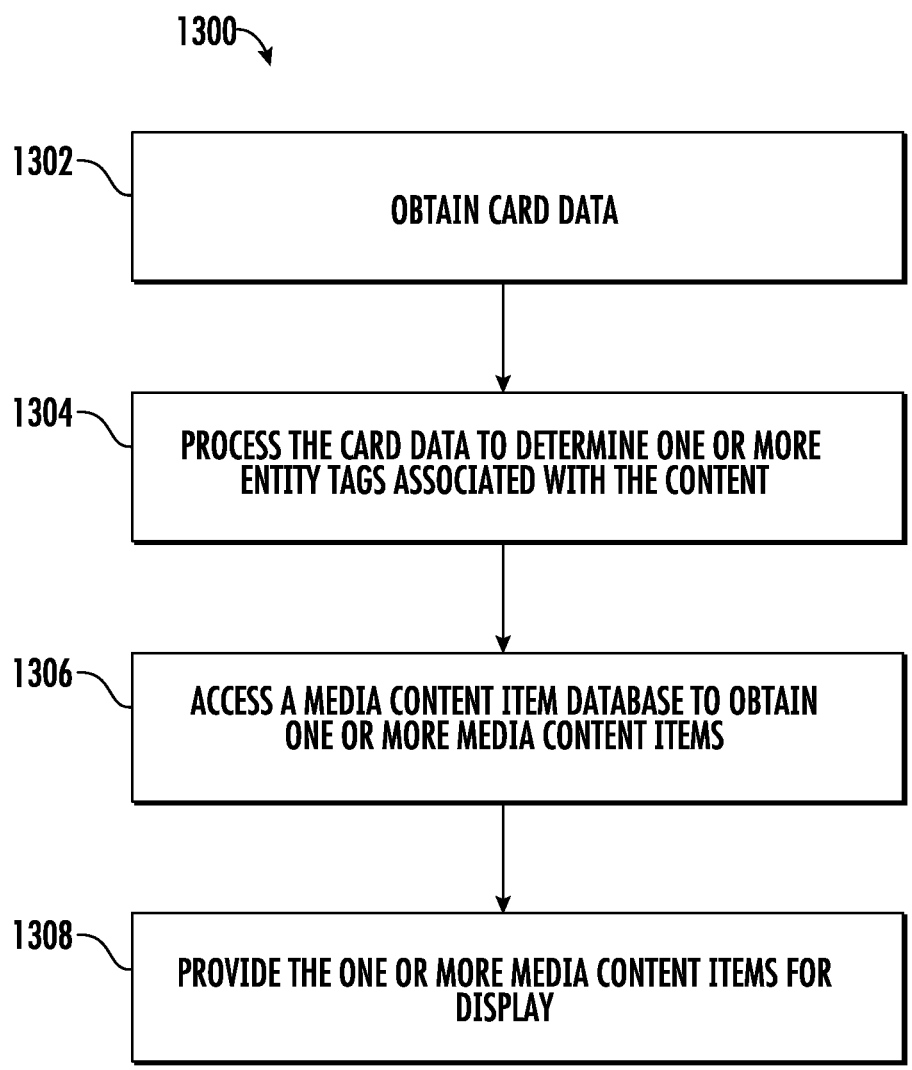
FIG. 13 depicts a flow chart diagram of an example method to perform image suggestion according to example embodiments of the present disclosure.

FIG. 13 depicts a flow chart diagram of an example method to perform according to example embodiments of the present disclosure. Although FIG. 13 depicts steps performed in a particular order for purposes of illustration and discussion, the methods of the present disclosure are not limited to the particularly illustrated order or arrangement. The various steps of the method 1300 can be omitted, rearranged, combined, and/or adapted in various ways without deviating from the scope of the present disclosure.

At 1302, a computing system can obtain card data. The card data can be descriptive of content in a graphical card. The content can be associated with one or more topics. The graphical card can be associated with a link note. The link note can include user-generated content tagged to a particular web resource. The graphical card can include a background, one or more images, one or more text strings, and/or one or more user interface elements. The background may include a single color, multiple colors, an image, and/or other data. The one or more user interface elements can include selectable widgets for providing additional information for display and/or for performing one or more actions. The content can include text data, image data, video data, latent encoding data, multimodal data, and/or other data.

At 1304, the computing system can process the card data to determine one or more entity tags associated with the content. The one or more entity tags can be associated with the one or more topics. The card data may be processed with one or more machine-learned models (e.g., a generative model, a classification model, and/or other model) to generate the entity tags. The entity tags may be associated with one or more objects, one or more companies, one or more locations, one or more individuals, one or more structures, and/or other entities.

At 1306, the computing system can access a media content item database to obtain one or more media content items. The one or more media content items can be obtained based on determining the one or more media content items are associated with the one or more entity tags associated with the content. The media content item database can include a user-specific database. In some implementations, the user-specific database can be associated with a particular user. The particular user may have generated at least a portion of the content. The user-specific database can include an image gallery associated with the particular user. The image gallery can be stored on a server computing system associated with a particular content item storage platform. Alternatively and/or additionally, the user-specific database can include a local storage database of a user computing device. The media content item database can include a plurality of media content items. The plurality of content items may have been preprocessed to generate a plurality of respective metadata sets. Determining the one or more media content items are associated with the one or more entity tags associated with the content can include determining whether the one or more media content items include features associated with the entity tags. The features can be determined based on metadata, image processing, and/or other techniques. The one or more media content items can include one or more images, one or more videos, one or more animations, one or more audio files, and/or one or more other content items.

At 1308, the computing system can provide the one or more media content items for display. The one or more media content items can be provided in an interactive user interface. The one or more media content items can be selectable to be inserted into the graphical card. The interactive user interface may provide a plurality of media content items for display, which can include media content items associated with the user, web media content items, and/or other media content items.

In some implementations, the computing system can obtain an input selection associated with the one or more media content items and generate an augmented graphical card. The augmented graphical card can include at least a portion of the content of the graphical card and at least a portion of the one or more media content items. The computing system can then provide the augmented graphical card for display.

Additionally and/or alternatively, the computing system can obtain an adjustment input. The adjustment input can be associated with a request to augment the augmented graphical card. The computing system can generate an updated graphical card based on the adjustment input. The updated graphical card can include the augmented graphical card with one or more adjustments. The computing system can then provide the updated graphical card for display. The one or more adjustments can include at least one of a layout change of the augmented graphical card, a cropping change for the one or more media content items, a size change for one or more content items, a color change, or template change.

Figure 14:
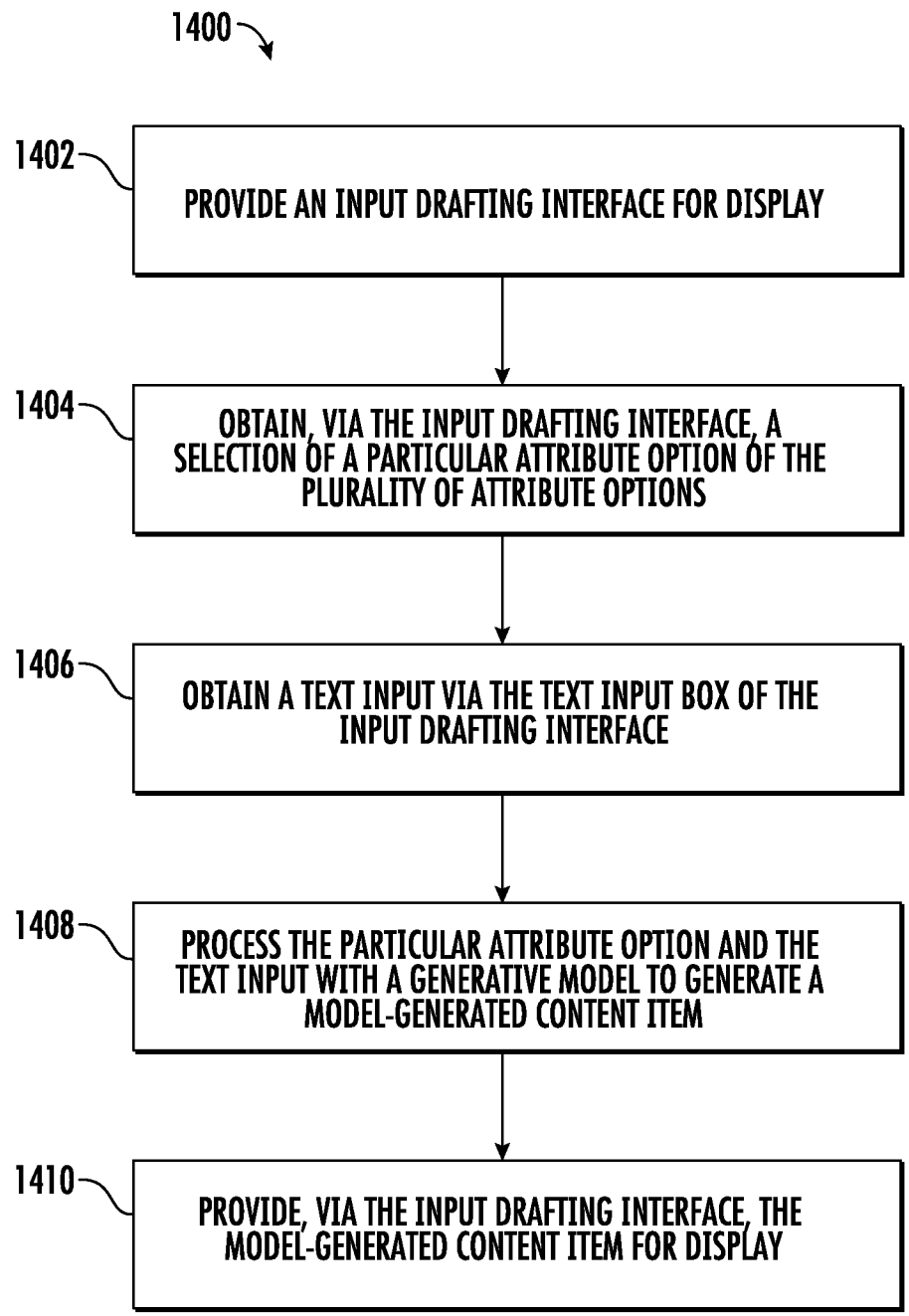
FIG. 14 depicts a flow chart diagram of an example method to perform content item generation according to example embodiments of the present disclosure.

FIG. 14 depicts a flow chart diagram of an example method to perform according to example embodiments of the present disclosure. Although FIG. 14 depicts steps performed in a particular order for purposes of illustration and discussion, the methods of the present disclosure are not limited to the particularly illustrated order or arrangement. The various steps of the method 1400 can be omitted, rearranged, combined, and/or adapted in various ways without deviating from the scope of the present disclosure.

At 1402, a computing system can provide an input drafting interface for display. The input drafting interface can include a graphical user interface including a plurality of attribute options and a text input box. The plurality of attribute options can be associated with a plurality of candidate attributes for content item generation. The plurality of candidate attributes can include tones, styles, lengths, content types, and/or other details. The input drafting interface may include a preview window for viewing a current state of a graphical card. The graphical card may be associated with a link note. In some implementations, the graphical card can include a card template that may have been modified based on one or more user inputs. For example, the user may have added images, text, audio, video, widgets, and/or other data.

At 1404, the computing system can obtain, via the input drafting interface, a selection of a particular attribute option of the plurality of attribute options. The particular attribute option can be associated with a particular candidate attribute. In some implementations, the plurality of candidate attributes can include a plurality of different styles. The plurality of different styles can be associated with at least one of a plurality of different artistic styles or a plurality of different writing styles. Alternatively and/or additionally, the plurality of candidate attributes can include a plurality of different tones. The plurality of different tones can be associated with at least one of a plurality of different sentiments and/or a plurality of different pacing types. The particular candidate attribute can include a tone and/or style requested for generating a content item. The selection may be obtained based on a selection of the particular attribute option from a dropdown menu that provides the plurality of attribute options for display.

At 1406, the computing system can obtain a text input via the text input box of the input drafting interface. The text input can be associated with a prompt intent for the content item generation. In some implementations, the text input may be auto-populated based on the content of the graphical card, based on a user context, and/or based on a prompt suggestion.

At 1408, the computing system can process the particular attribute option and the text input with a generative model to generate a model-generated content item. The mode-generated content item can include the particular candidate attribute. The model-generated content item can be associated with the prompt intent. The model-generated content item can include text data, image data, audio data, multimodal data, and/or other data. In some implementations, the generative model can be obtained from a generative model database based on the selection of the particular attribute option. For example, the generative model database may store a plurality of different generative models associated with the plurality of candidate attributes. Each of the plurality of different generative models may be configured, trained, and/or tuned to generate content items associated with the respective candidate attribute. Alternatively and/or additionally, the generative model may be a general generative model trained for a plurality of content generation tasks. Additionally and/or alternatively, a particular attribute soft prompt can be obtained based on the selection of the particular attribute option. The particular attribute soft prompt can include a set of learned parameters. The set of learned parameters can be processed with the generative model to generate the model-generated content item.

At 1410, the computing system can provide, via the input drafting interface, the model-generated content item for display. Providing the model-generated content item for display can include providing an option to insert the model-generated content item into the graphical card. The input drafting interface may include a plurality of post-processing editing options, which may include options to change a size, color, font, cropping, resolution, saturation, tinting, and/or other details.

In some implementations, the computing system can obtain an input selection via the input drafting interface and generate an augmented graphical card based on the input selection. The augmented graphical card can include a graphical card augmented to include the model-generated content item. The computing system can then provide the augmented graphical card for display.

Figure 15A:
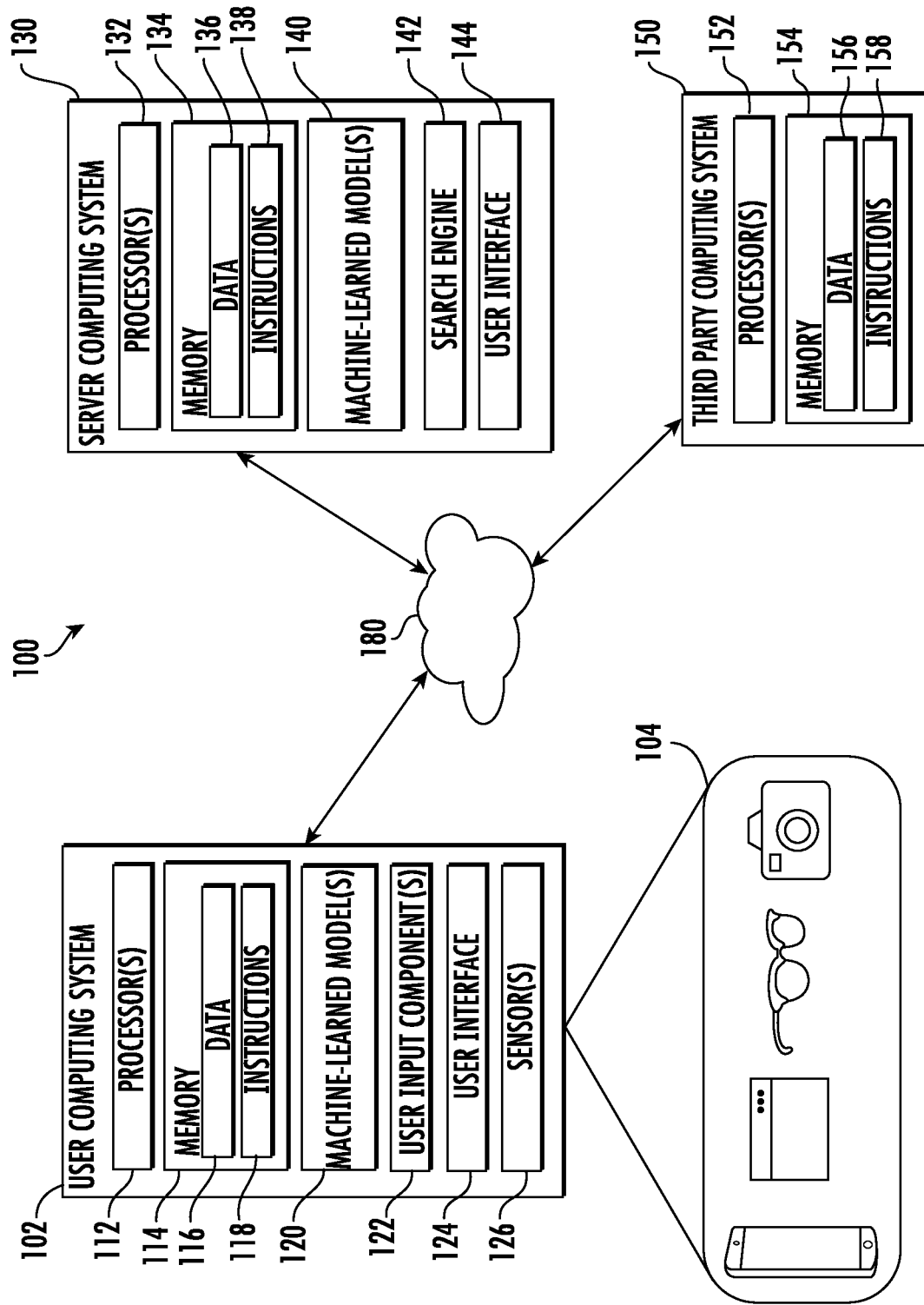
FIG. 15A depicts a block diagram of an example computing system that performs link note prompting according to example embodiments of the present disclosure.

FIG. 15A depicts a block diagram of an example computing system 100 that performs link note prompting according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or pe part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 15B.

Additionally and/or alternatively, the server computing system 130 can include and/or be communicatively connected with a search engine 142 that may be utilized to process one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 15B:
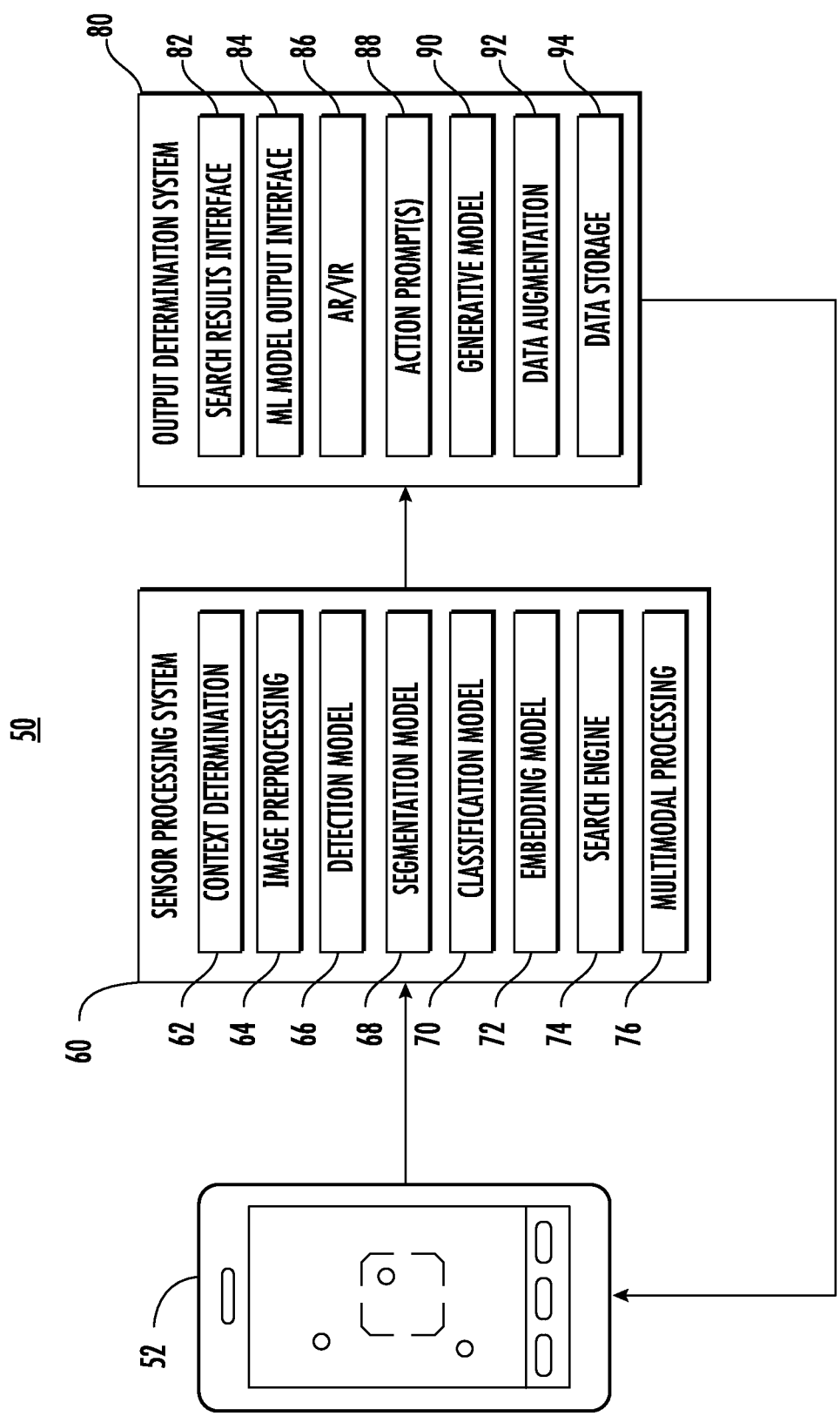
FIG. 15B depicts a block diagram of an example computing system that performs link note prompting according to example embodiments of the present disclosure.

FIG. 15B depicts a block diagram of an example computing system 50 that performs link note prompting according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 90 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 90 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 90 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 90 may include a vision language model.

The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for comment prompt generation and input retrieval, the system comprising:
   one or more processors; and
   one or more non-transitory computer-readable media that collectively store instructions that, when executed by the one or more processors, cause the computing system to perform operations, the operations comprising:
      obtaining content data, wherein the content data is associated with a web resource, wherein the web resource comprises one or more content items;
      processing the content data with a generative model to generate a predicted prompt, wherein the prompt comprises a predicted text string associated with commenting on the web resource;
      providing the predicted prompt for display with an input prompting interface, wherein the input prompting interface is configured to receive inputs;
      obtaining comment input data from a user computing system via the input prompting interface, wherein the comment input data comprises a user-generated comment on the web resource;
      obtaining user data, wherein the user data is associated with a particular user, wherein the user computing system is associated with the particular user;

generating a graphical card based on the user data, the content data, and the comment input data, wherein the graphical card comprises a user profile identifier for the particular user and data associated with the comment input data, wherein the graphical card comprises a graphical background generated with an image generation model based on the comment input data; and storing the graphical card and data associated with the comment input data with data associated with the web resource, wherein the data associated with the comment input data is stored in a searchable database to be provided for display in response to the web resource being provided as a search result.

2. The system of claim 1, wherein the user data comprises user search history data, and wherein the generative model generates the predicted prompt based on the particular user previously searching for information associated with a topic of the web resource.

3. The system of claim 1, wherein the user data comprises user browser history data, and wherein the generative model generates the predicted prompt based on the particular user previously viewing other web resources comprising information associated with a topic of the web resource.

4. The system of claim 1, wherein the operations further comprise:
obtaining a search query;
determining the web resources is associated with the search query;
providing a particular search result for display, wherein the particular search results comprises a link to the web resource, a title of the web resource, and data associated with the comment input data.

5. The system of claim 1, wherein storing the data associated with the comment input data with the data associated with the web resource comprises:
generating a web resource note; and
storing the web resource note with a plurality of other web resource notes associated with the web resource.

6. The system of claim 5, wherein the operations further comprise:
providing the web resource note and the plurality of other web resource notes in a notes interface that provides the web resource note and the plurality of other web resource notes in a plurality of graphical cards.

7. The system of claim 1, wherein the operations further comprise:
obtaining a selection of a requested attribute for augmenting the user-generated comment;
processing the user-generated comment and data descriptive of the requested attribute with the generative model to generate a model-generated content item; and
augmenting the graphical card to include the model-generated content item.

8. The system of claim 1, wherein the operations further comprise:
processing the graphical card to determine one or more entity tags based on a determined topic of the graphical card;
accessing a media content item database to obtain one or more additional media content items based on the one or more entity tags; and
providing the one or more additional media content items for display.

9. The system of claim 1, wherein the operations further comprise:
providing a graphical card customization interface for display, wherein the graphical card customization interface comprises a plurality of options for editing the graphical card.

10. The system of claim 1, wherein the generative model comprises an autoregressive language model, and wherein the generative model is prompted to generate a question descriptive of a request for information on the web resource.

11. A computer-implemented method for link note prompting, the method comprising:
obtaining, by a computing system comprising one or more processors, context data, wherein the context data is associated with a particular content display instance, wherein the particular content display instance comprises a particular user viewing a particular content item of a particular web resource;
determining, by the computing system, an input request action based on the context data, wherein the input request action comprises providing an input entry interface to a user to obtain a user input;
processing, by the computing system, the context data with a generative language model to generate a predicted prompt, wherein the predicted prompt comprises a natural language request for information generated based on the context data;
providing, by the computing system, the predicted prompt in the input entry interface;
obtaining, by the computing system, user-generated content via the input entry interface;
obtaining, by the computing system, user data, wherein the user data is associated with a particular user, wherein the user-generated content is associated with the particular user;
generating, by the computing system, a graphical card based on the user data and the user-generated content, wherein the graphical card comprises a user profile identifier for the particular user and data associated with the user-generated content, wherein the graphical card comprises a graphical background generated with an image generation model based on the user-generated content; and
generating, by the computing system, a link note comprising the graphical card based on the user-generated content, wherein the link note is generated to be provided for display in a search results interface in response to the particular content item being determined as a search result.

12. The method of claim 11, wherein the context data is associated with a type of content being provided for display.

13. The method of claim 11, wherein the context data is associated with the particular user associated with the particular content display instance, wherein the context data comprises search history data.

14. The method of claim 11, wherein content being provided for display is associated with a particular web resource, wherein the context data is associated with interaction data for a link of the particular web resource on a plurality of social network platforms, and wherein the input request action is determined based on the interaction data.

15. The method of claim 11, wherein the context data comprises user data and content data, and wherein the input request action is determined based on a topic associated with content being provided for display being one of a plurality of topics the particular user is determined to have knowledge of based on the user data.

16. The method of claim 11, wherein the context data comprises previous notes generated by the particular user, and wherein the predicted prompt comprises a structure based on previous structures for the previous notes.

17. One or more non-transitory computer-readable media that collectively store instructions that, when executed by one or more computing devices, cause the one or more computing devices to perform operations, the operations comprising:

obtaining a first search query at a first time;

determining a web resource is responsive to the first search query, wherein the web resource comprises one or more content items;

obtaining content data, wherein the content data is associated with the web resource;

processing the content data with a generative model to generate a predicted prompt, wherein the prompt comprises a predicted text string associated with commenting on the web resource;

providing the predicted prompt for display within an input prompting interface, wherein the input prompting interface comprises an input entry box;

obtaining comment input data from a user computing system via the input prompting interface, wherein the comment input data comprises user-generated content;

obtaining user data, wherein the user data is associated with a particular user, wherein the user computing system is associated with the particular user;

generating a graphical card based on the user data, the content data, and the comment input data, wherein the graphical card comprises a user profile identifier for the particular user and data associated with the comment input data, wherein the graphical card comprises a graphical background generated with an image generation model based on the comment input data;

storing the graphical card;

obtaining a second search query at a second time, wherein the second time differs from the first time;

determining the web resource is responsive to the second search query; and providing the graphical card in a search results interface with data descriptive of the web resource.

18. The one or more non-transitory computer-readable media of claim 17, wherein the first search query and the second search query differ.

19. The one or more non-transitory computer-readable media of claim 17, wherein the comment input data comprises multimodal data.

20. The one or more non-transitory computer-readable media of claim 19, wherein the multimodal data comprises text data and image data.

* * * * *